(12) United States Patent
Mou et al.

(10) Patent No.: US 12,435,890 B2
(45) Date of Patent: Oct. 7, 2025

(54) INDOOR AIR POLLUTION PREVENTION SYSTEM

(71) Applicant: MICROJET TECHNOLOGY CO., LTD., Hsinchu (TW)

(72) Inventors: Hao-Jan Mou, Hsinchu (TW); Chin-Chuan Wu, Hsinchu (TW); Ching-Sung Lin, Hsinchu (TW); Yung-Lung Han, Hsinchu (TW); Chi-Feng Huang, Hsinchu (TW); Tsung-I Lin, Hsinchu (TW); Chin-Wen Hsieh, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 730 days.

(21) Appl. No.: 17/586,902

(22) Filed: Jan. 28, 2022

(65) Prior Publication Data

US 2022/0349593 A1  Nov. 3, 2022

(30) Foreign Application Priority Data

Apr. 29, 2021   (TW) .................................. 110115675

(51) Int. Cl.
*F24F 7/003*   (2021.01)
*A61L 9/014*   (2006.01)
(Continued)

(52) U.S. Cl.
CPC .............. *F24F 7/003* (2021.01); *A61L 9/014* (2013.01); *B01D 46/429* (2013.01);
(Continued)

(58) Field of Classification Search
CPC .... F24F 7/003; F24F 8/10; F24F 13/10; F24F 11/65; F24F 2110/50; G05B 15/02;
(Continued)

(56) References Cited

U.S. PATENT DOCUMENTS

| | | | | |
|---|---|---|---|---|
| 2015/0052978 A1* | 2/2015 | Beier | ................. | B01D 46/0086 73/38 |
| 2015/0153317 A1* | 6/2015 | Krebs | ................ | G01N 33/0036 96/397 |

(Continued)

FOREIGN PATENT DOCUMENTS

| | | |
|---|---|---|
| CN | 105229389 A | 1/2016 |
| CN | 105352115 A | 2/2016 |

(Continued)

*Primary Examiner* — Jennifer Dieterle
*Assistant Examiner* — Qianping He
(74) *Attorney, Agent, or Firm* — Birch, Stewart, Kolasch & Birch, LLP

(57) ABSTRACT

An indoor pollution prevention system includes a plurality of gas detection modules, one or more intelligent control-driving processing devices, one or more gas-exchange processing devices, and one or more indoor cleaning and filtration devices. The gas-exchange processing device includes one or more flow-guiding component and a cleaning and filtration assembly. The intelligent control-driving processing device controls the operation of the indoor cleaning and filtration device in real-time under a surveillance condition, therefore the air pollution source in the indoor space passes through the indoor cleaning and filtration device, allowing the air pollution source in the indoor space to be filtered and exchanged to become a clean air.

21 Claims, 22 Drawing Sheets

(51) Int. Cl.
*B01D 46/42* (2006.01)
*B01D 46/44* (2006.01)
*B01D 46/46* (2006.01)
*F24F 8/10* (2021.01)
*F24F 11/65* (2018.01)
*F24F 13/10* (2006.01)
*G01N 33/00* (2006.01)
*G05B 15/02* (2006.01)
*F24F 110/50* (2018.01)

(52) U.S. Cl.
CPC .......... *B01D 46/442* (2013.01); *B01D 46/46* (2013.01); *F24F 8/10* (2021.01); *F24F 11/65* (2018.01); *F24F 13/10* (2013.01); *G01N 33/0063* (2013.01); *G01N 33/0075* (2013.01); *G05B 15/02* (2013.01); *A61L 2209/111* (2013.01); *A61L 2209/14* (2013.01); *B01D 2279/50* (2013.01); *F24F 2110/50* (2018.01)

(58) Field of Classification Search
CPC ........ B01D 46/46; B01D 46/44; B01D 46/42; B01D 46/429; B01D 46/442; B01D 2279/50; A61L 9/014; A61L 2209/111; A61L 2209/14; G01N 33/0063; G01N 33/0075
USPC .......................................................... 96/399
See application file for complete search history.

(56) References Cited

U.S. PATENT DOCUMENTS

| | | | | |
|---|---|---|---|---|
| 2017/0067813 | A1* | 3/2017 | Zhang | ............... F01N 11/00 |
| 2017/0113517 | A1* | 4/2017 | Kwon | ............... B01D 46/0091 |
| 2017/0356670 | A1* | 12/2017 | Zhang | ............... F24F 11/77 |
| 2018/0322766 | A1* | 11/2018 | Pierson | ............... G08B 21/187 |
| 2019/0056369 | A1* | 2/2019 | Mou | ............... G01N 33/007 |
| 2021/0063036 | A1 | 3/2021 | Oh et al. | |

FOREIGN PATENT DOCUMENTS

| | | | |
|---|---|---|---|
| CN | 107435963 | A | 12/2017 |
| CN | 110107952 | A | 8/2019 |
| JP | 2005149282 | A | 6/2005 |
| JP | 2015190688 | A | 11/2015 |
| JP | 2016075443 | A | 5/2016 |
| JP | 2019100588 | A | 6/2019 |
| JP | 2020012846 | A | 1/2020 |
| JP | 2020051658 | A | 4/2020 |
| JP | 2020176799 | A | 10/2020 |
| JP | 2021042936 | A | 3/2021 |
| KR | 20100019825 | A * | 2/2010 |
| KR | 20190031707 | A | 3/2019 |
| KR | 102081237 | B1 | 2/2020 |
| TW | I708934 | B | 11/2020 |
| WO | 2014185013 | A1 | 11/2014 |
| WO | 2018/061147 | A1 | 4/2018 |
| WO | 2018109522 | A1 | 6/2018 |
| WO | 2019091987 | A1 | 5/2019 |
| WO | 2020144247 | A1 | 7/2020 |
| WO | 2021/005736 | A1 | 1/2021 |

* cited by examiner

INDOOR AIR POLLUTION PREVENTION SYSTEM

CROSS-REFERENCE TO RELATED APPLICATION

This non-provisional application claims priority under 35 U.S.C. § 119(a) to Patent Application No. 110115675 in Taiwan, R.O.C. on Apr. 29, 2021, the entire contents of which are hereby incorporated by reference.

BACKGROUND

Technical Field

The present disclosure relates to a system which performs gas exchange in the indoor space, in particular, to an indoor air pollution prevention system.

Related Art

In the light of people pay more and more attention to the ambient air quality in daily life by nowadays, it is understood that, gases containing particulate matters (PM1, PM2.5, PM10), carbon dioxide, total volatile organic compounds (TVOC), formaldehyde, etc. or even the particulates, the aerogels, the bacteria, the viruses in the gas might result in adverse effects on the human health, even might be life-threatening when exposure to these gases.

As stated above, it is not easy to control the indoor gas quality since the affecting factors include not only the outdoor space gas quality but also the air conditioning and the pollution source in the indoor space (especially the dusts originated from poor circulation of air in the indoor space). In order to improve the indoor gas quality, air conditioners or air cleaners can be utilized. However, the air conditioner and the air cleaner perform indoor circulation and fail to eliminate most hazardous gases, especially carbon monoxide and carbon dioxide.

Consequently, it is an issue of the present invention to provide a solution that can instantly purify and improve the gas quality of the indoor space, reducing the risks of inhaling hazardous gases and monitoring the gas quality of the indoor space anytime and anywhere.

SUMMARY

In view of the disadvantages, one object of the present disclosure is to provide an indoor air pollution prevention system with a gas-exchange processing device to intelligently and selectively perform gas exchange of the polluted gas, allowing the detection data of the air pollution source in the indoor space can be reduced to a safety detection value, allowing the air pollution source to become a clean air.

In view of above object, in one embodiment of the present disclosure, an indoor air pollution prevention system adapted to perform gas exchange and filtration for an air pollution source in an indoor space is provided. The system includes a plurality of gas detection modules, at least one intelligent control-driving processing device, at least one gas-exchange processing device, and at least one indoor cleaning and filtration device. The gas detection modules are provided for detecting the air pollution source and transmitting a gas detection data. The at least one intelligent control-driving processing device is adapted to receive and compare the gas detection data outputted by the gas detection modules, intelligently and selectively transmitting a driving command outwardly. The at least one gas-exchange processing device receives the driving command transmitted by the at least one intelligent control-driving processing device to control whether an outdoor gas to be introduced into the indoor space or not, filtering and performing gas exchange of the air pollution source in the indoor space. The at least one indoor cleaning and filtration device receives the driving command outputted by the at least one intelligent control-driving processing device to filter and perform gas exchange of the air pollution source in the indoor space. Each of the at least one gas-exchange processing device and the at least one indoor cleaning and filtration device further comprises a flow-guiding component and a cleaning and filtration assembly. After the at least one intelligent control-driving processing device receives and compares the gas detection data, the at least one intelligent control-driving processing device intelligently and selectively controls the at least one gas-exchange processing device whether to introduce the outdoor gas or not, and the at least one intelligent control-driving processing device controls the indoor cleaning and filtration device to be enabled in real-time under a surveillance condition. Therefore, the air pollution source in the indoor space passes through the at least one indoor cleaning and filtration device, allowing the air pollution source in the indoor space to be filtered and exchanged to become a clean air.

BRIEF DESCRIPTION OF THE DRAWINGS

The disclosure will become more fully understood from the detailed description given herein below, for illustration only and thus not limitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure. Furthermore, the person in the art of the present invention should understand that both the gas-exchange processing device 3 and indoor cleaning and filtration devices 4 include a flow-guiding component C and a filtration assembly D, therefore the flow-guiding component C and filtration assembly D may have the adaptation to said gas-exchange processing device 3 and the indoor cleaning and filtration device 4 according to the application of the embodiment. For the convenience of explanation and distinction, the flow-guiding component C may define as a first flow-guiding component, a second flow-guiding component, a third flow-guiding component, and so on, similarly, the filtration assembly D may define as a first filtration assembly, a second filtration assembly, a third filtration assembly, and so on.

Figure 1A:
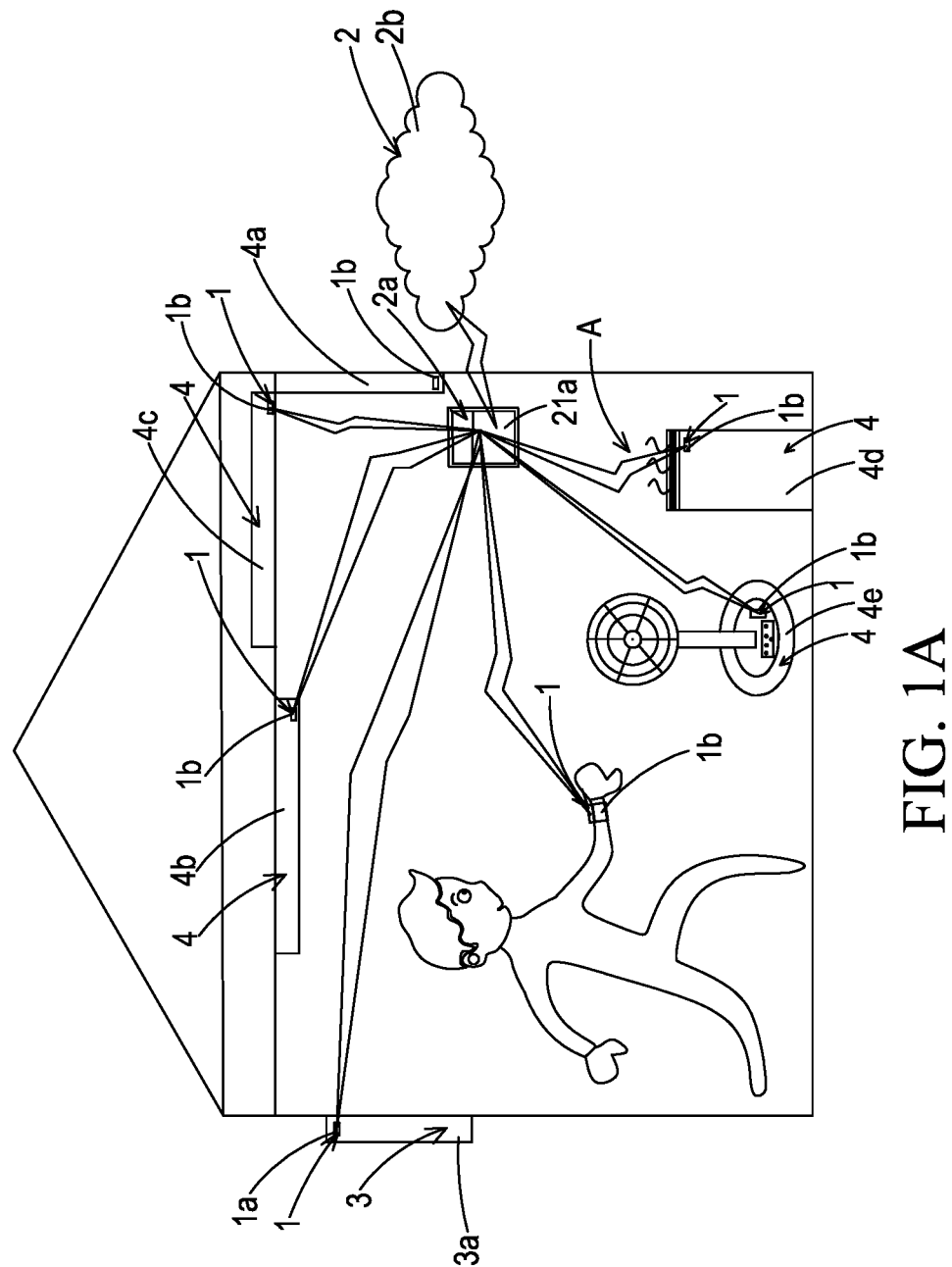
FIG. 1A illustrates a schematic view for the operation of an indoor air pollution prevention system of an exemplary embodiment in the present disclosure, where the system is assembled in the indoor space.
Figure 1B:
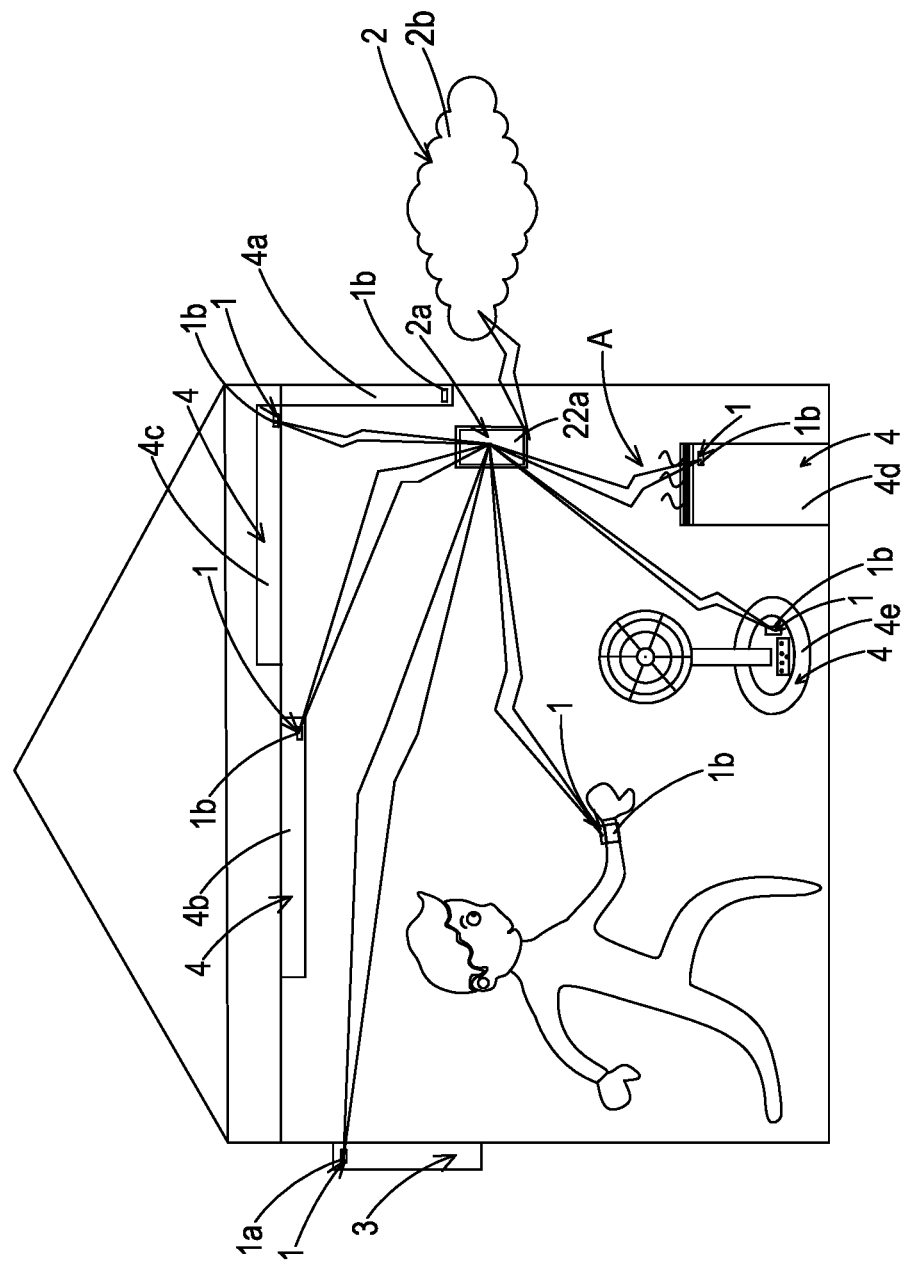
FIG. 1B illustrates a schematic view for the operation of the indoor air pollution prevention system of another exemplary embodiment in the present disclosure, where the system is assembled in the indoor space.
Figure 2:
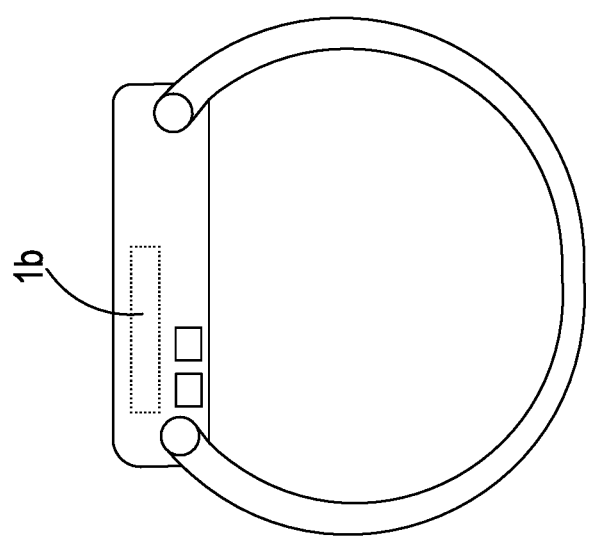
FIG. 2 illustrates a schematic view for the operation of an indoor gas detection module of the exemplary embodiment in the present disclosure.
Figure 3:
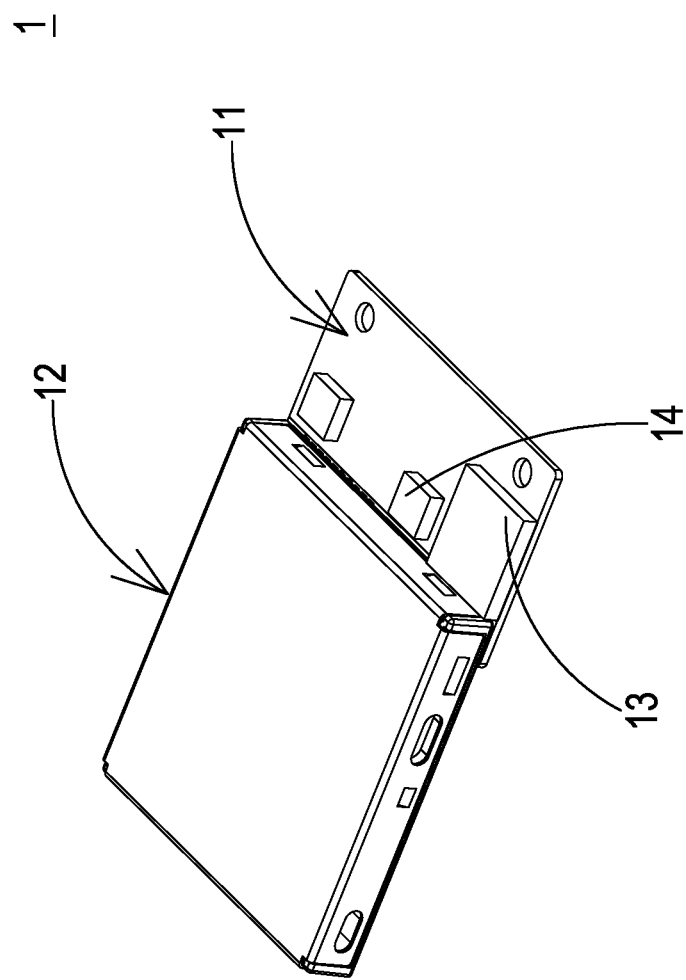
FIG. 3 illustrates a schematic perspective view of a gas detection module of the exemplary embodiment in the present disclosure.
Figure 4A:
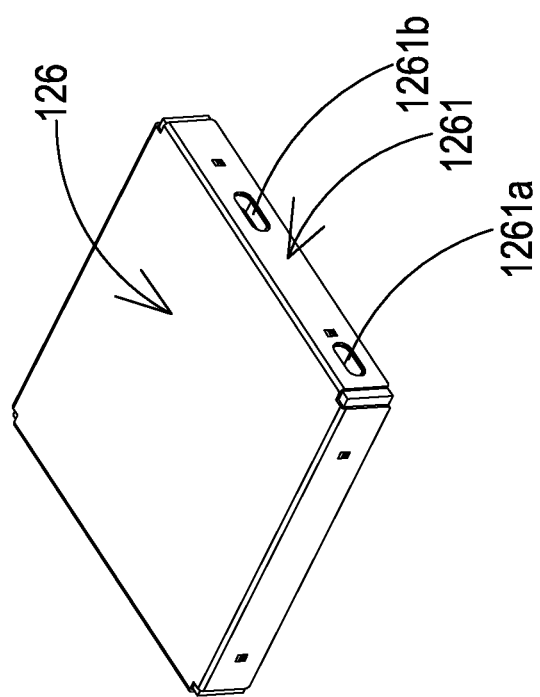
FIG. 4A illustrates a schematic perspective view of a gas detection main body of the exemplary embodiment in the present disclosure.
Figure 4B:
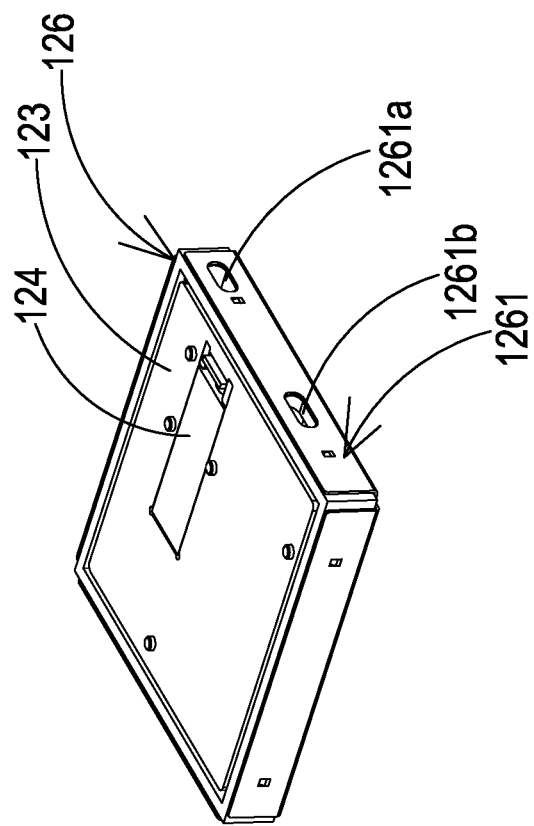
FIG. 4B illustrates another schematic perspective view of the gas detection main body of the exemplary embodiment in the present disclosure.
Figure 4C:
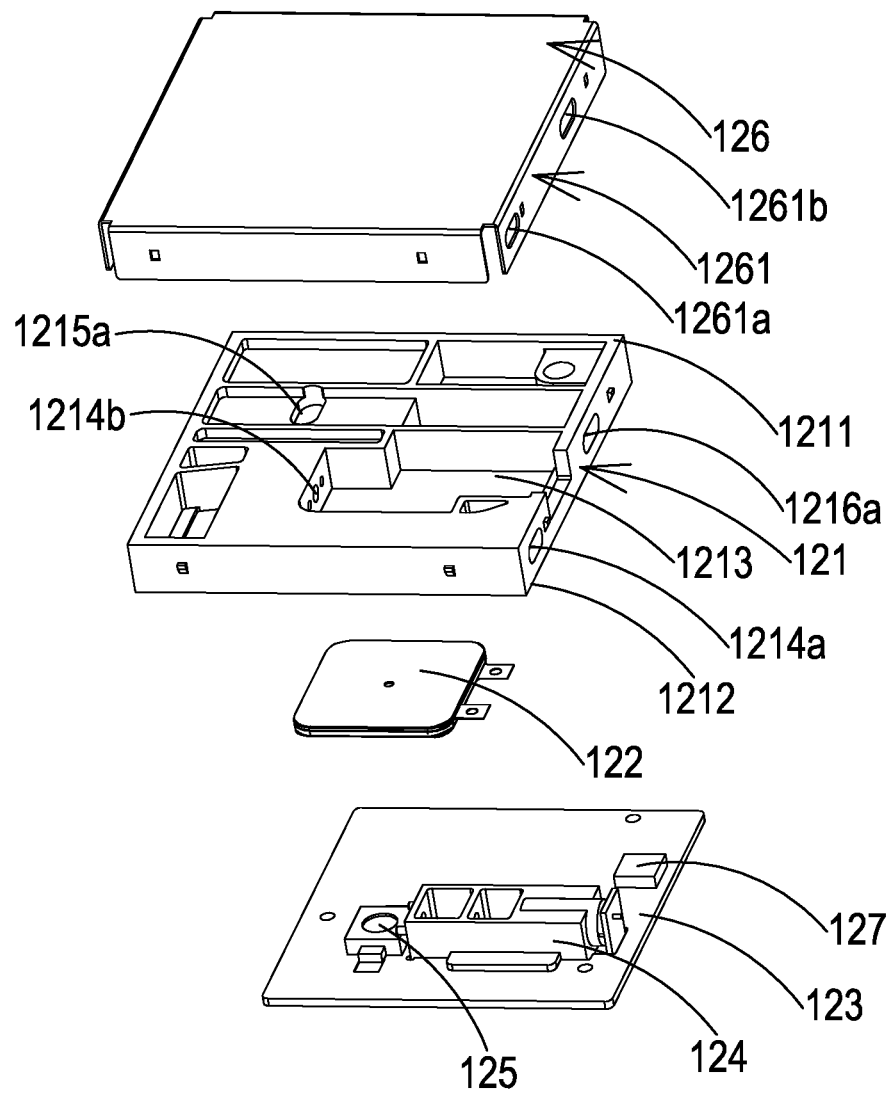
FIG. 4C illustrates an exploded view of the gas detection main body of the exemplary embodiment in the present disclosure.
Figure 5A:
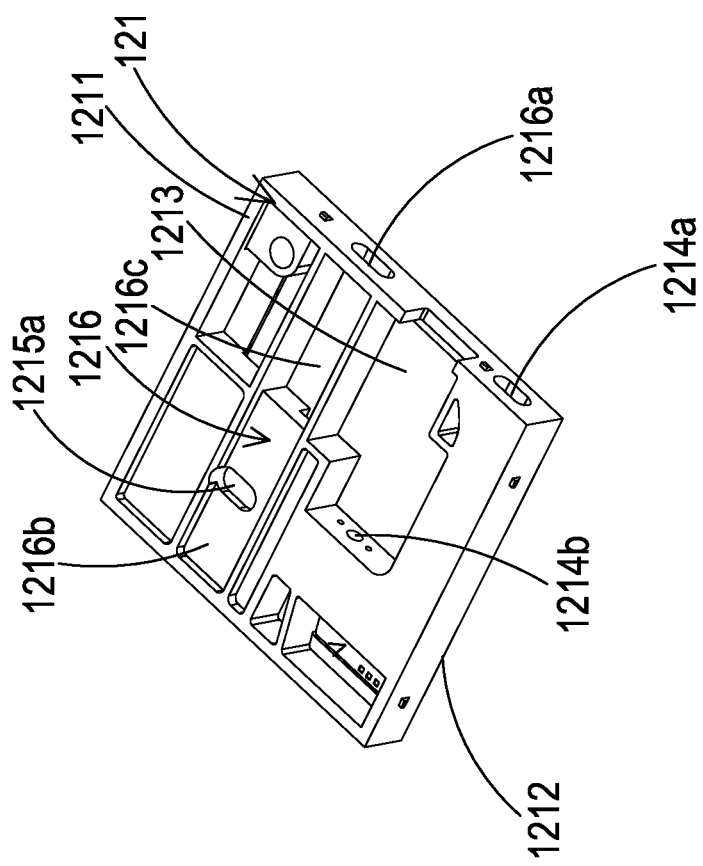
FIG. 5A illustrates a perspective view of a base of the exemplary embodiment in the present disclosure.
Figure 5B:
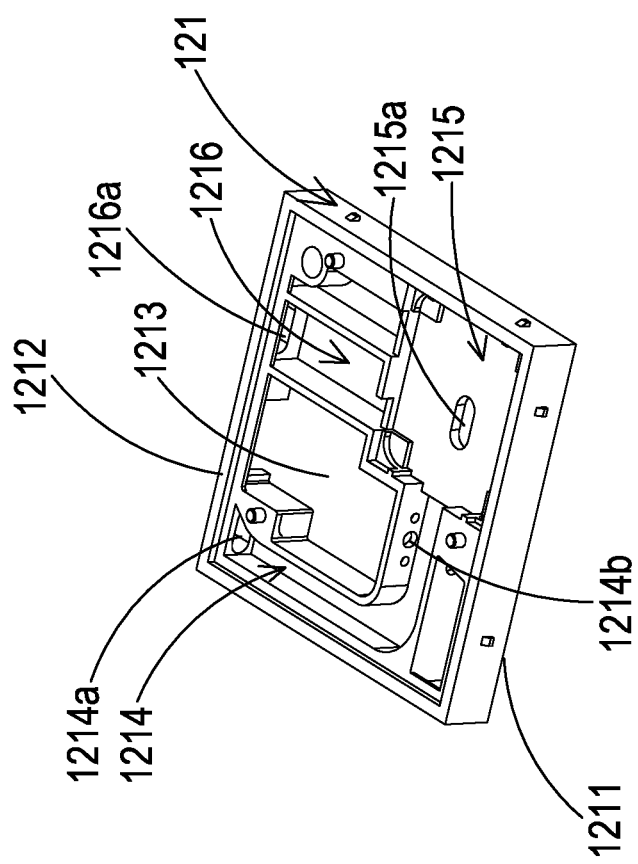
FIG. 5B illustrates another perspective view of the base of the exemplary embodiment in the present disclosure.
Figure 6:
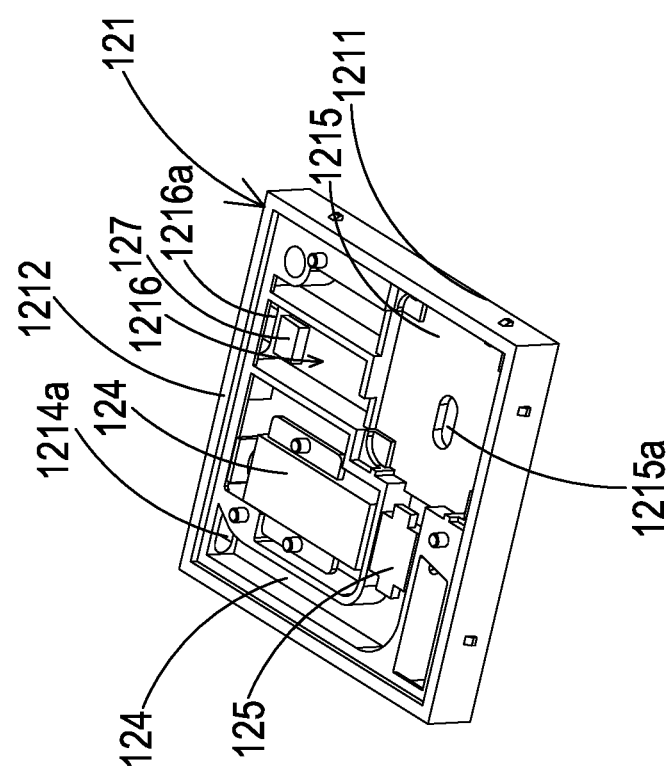
FIG. 6 illustrates a perspective view showing that the base is assembled with a laser component of the exemplary embodiment in the present disclosure.
Figure 7A:
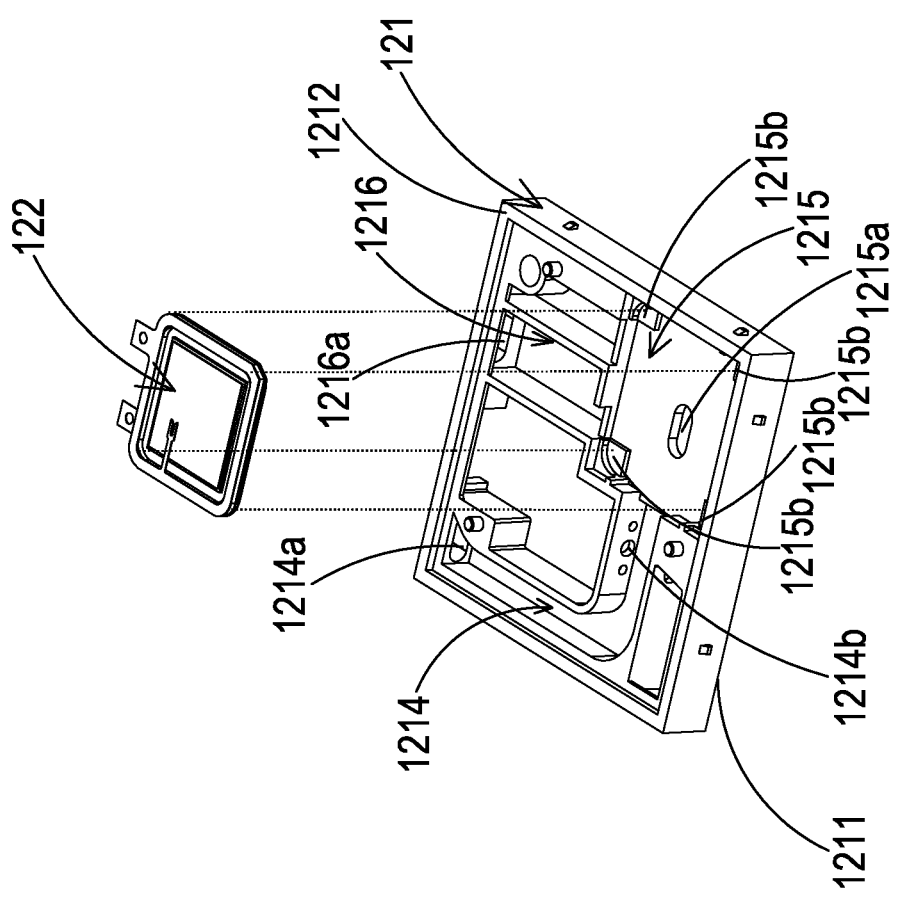
FIG. 7A illustrates an exploded view showing that a piezoelectric actuator is to be disposed in the base, according to the exemplary embodiment in the present disclosure.
Figure 7B:
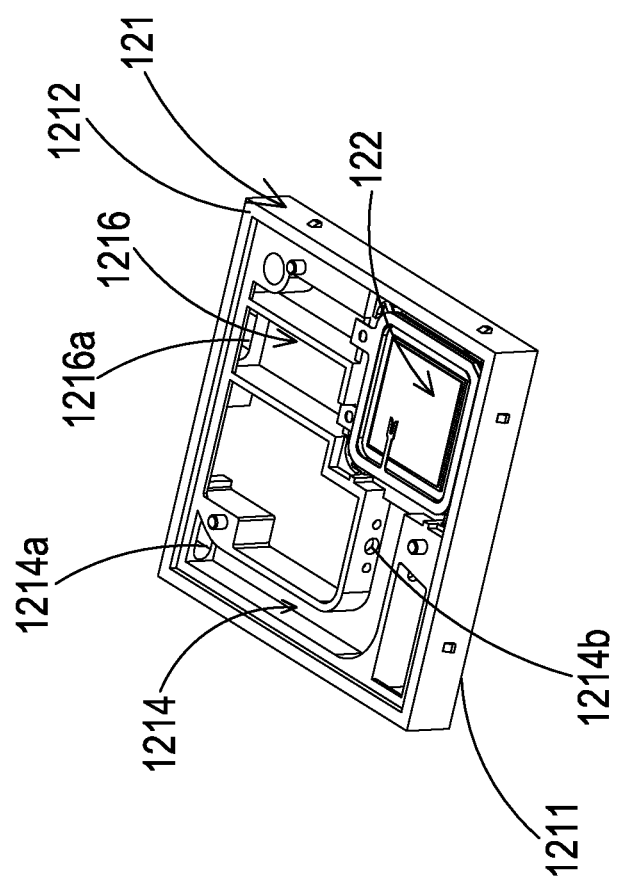
FIG. 7B illustrates a perspective view showing that the piezoelectric actuator is disposed in the base, according to the exemplary embodiment in the present disclosure.
Figure 8A:
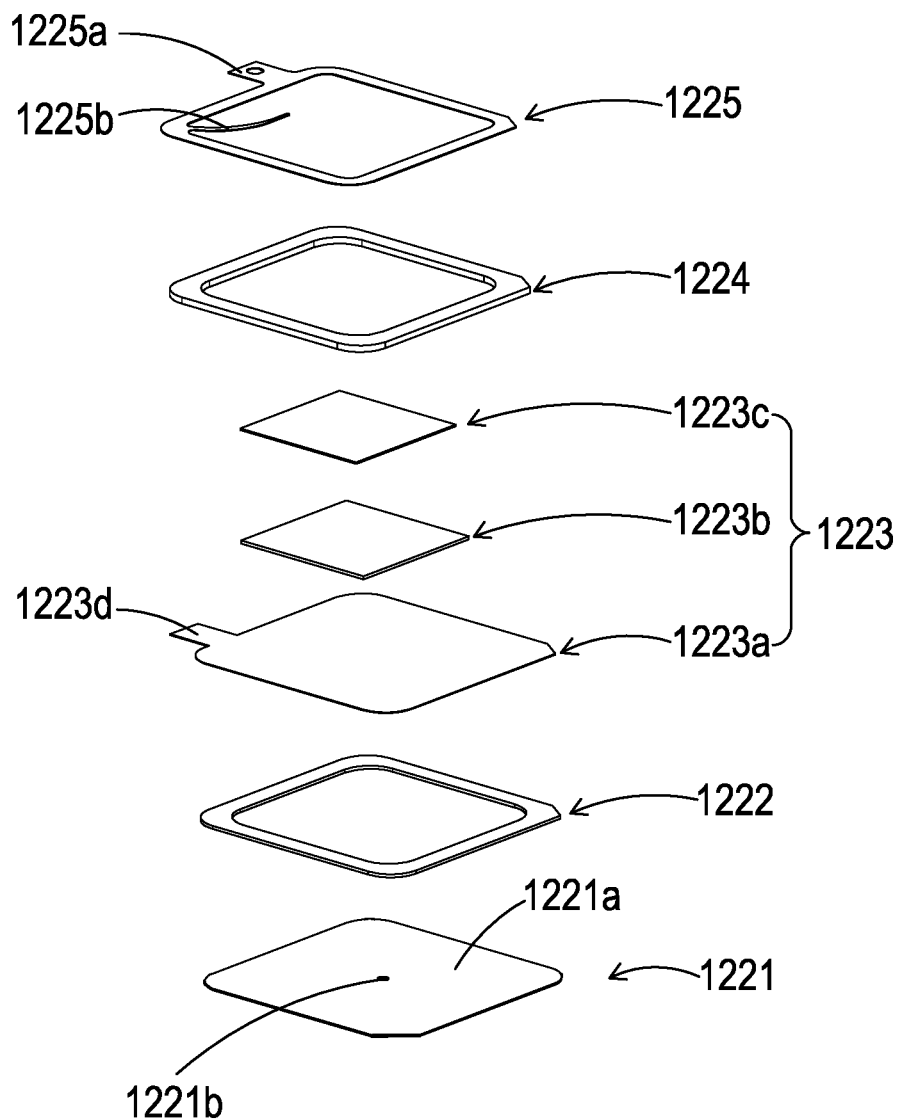
FIG. 8A illustrates an exploded view of the piezoelectric actuator of the exemplary embodiment in the present disclosure.
Figure 8B:
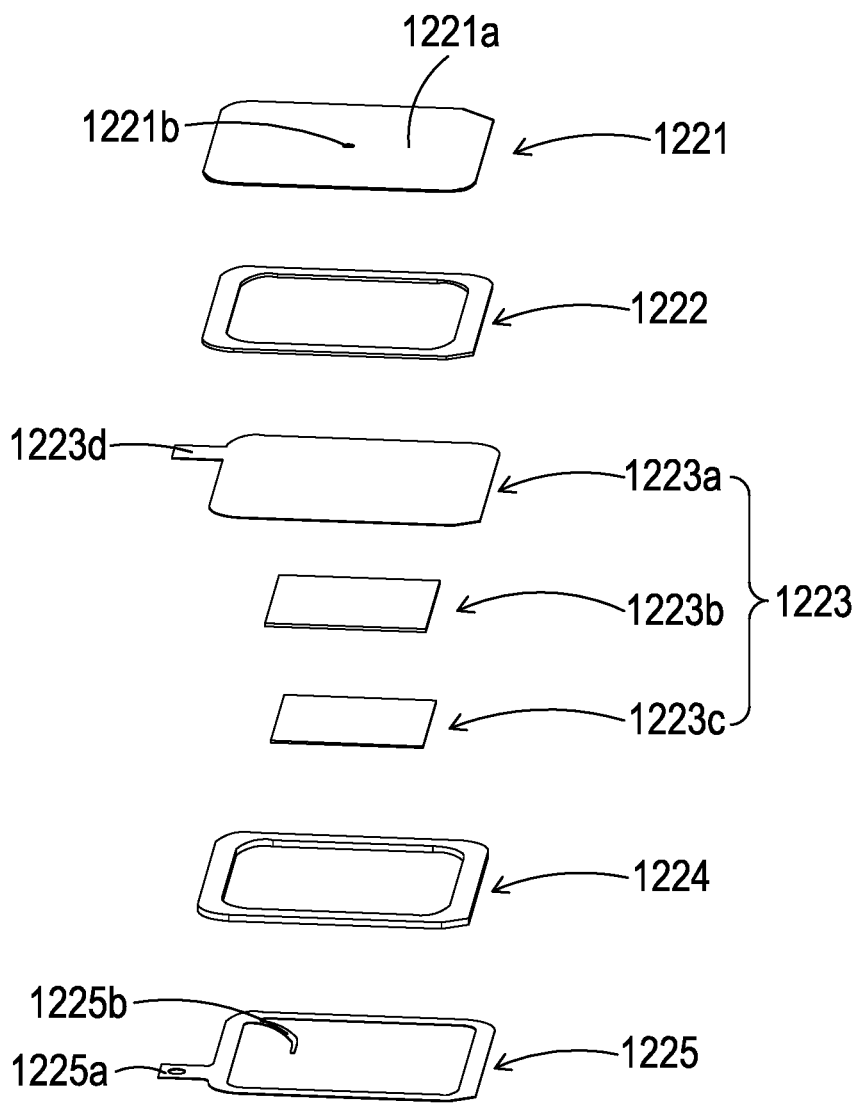
FIG. 8B illustrates another exploded view of the piezoelectric actuator of the exemplary embodiment in the present disclosure.

Please refer to FIG. 1A, FIG. 1B, and FIG. 2, according to one or some embodiments of the present disclosure, an indoor air pollution prevention system is provided and is adapted to perform gas exchange and filtration for an indoor space A. The system includes a plurality of gas detection modules 1, at least one intelligent control-driving processing device 2, at least one gas-exchange processing device 3, and at least one indoor cleaning and filtration device 4. The gas detection modules 1 are provided for detecting, filtering polluted gas and transmitting a gas detection data. The gas detection modules 1 include a plurality of outdoor gas detection modules 1a and a plurality of indoor gas detection modules 1b. The outdoor gas detection module 1a detects an outdoor gas in an outdoor space B and transmits an outdoor gas detection data; the indoor gas detection module 1b detects an air pollution source in the indoor space A and transmits an indoor gas detection data.

The intelligent control-driving processing device 2 includes a receiving driver 2a and a cloud processing device 2b. The receiving driver 2a receives the gas detection data outputted by the outdoor gas detection module 1a and the indoor gas detection module 1b, and transmits the gas detection data to the cloud processing device 2b, wherein the gas detection data includes the indoor gas detection data from indoor space A and the outdoor gas detection data from outdoor space B. The cloud processing device 2b performs intelligent computation and comparison to generate a comparison result, and the cloud processing device 2b intelligently and selectively transmits the driving command to the receiving driver 2a according to the comparison result, so that the receiving driver 2a enables the operations of the gas-exchange processing device 3 and the indoor cleaning and filtration device 4. In one embodiment of the present invention, the receiving driver 2a may be a movable driver 21a, a mobile device 22a, or a wearable device. The movable device 21a has a monitor to display the indoor gas detection data. The mobile device 22a can be a smart phone to display the indoor gas detection data. The wearable device may be assembled with the indoor gas detection module 1b and is capable of being worn on human to detect the air pollution source in the indoor space A in real-time and transmit the indoor gas detection data to the intelligent control-driving processing device 2, wherein the indoor gas detection data is detected from indoor space A, and the outdoor gas detection data is detected from outdoor space B.

The gas-exchange processing device 3 (which may be a fresh air purifier 3a) has a monitor to display the indoor gas detection data. In one preferred embodiment of the present invention, the gas-exchange processing device 3 is made collaborative operation with the outdoor gas detection module 1a and the indoor gas detection module 1b. The indoor gas detection module 1b enables the operation of the gas-exchange processing device 3, the intelligent control-driving processing device 2 receives the outdoor gas detection data outputted by the outdoor gas detection module 1a from outdoor space B and compares the indoor gas detection data outputted by the indoor gas detection module 1b from the indoor space A with the outdoor gas detection data outputted by the outdoor gas detection module 1a from the outdoor space B for performing an intelligent selection and transmitting the driving command to the indoor gas detection module 1b for enabling the gas-exchange processing device 3 to control whether the outdoor gas to be introduced into the indoor space A or not, so as to ensure the gas-exchange processing device 3 to filter and perform gas exchange of the air pollution source to form the clean air to be introduced into the indoor space A.

Figure 11:
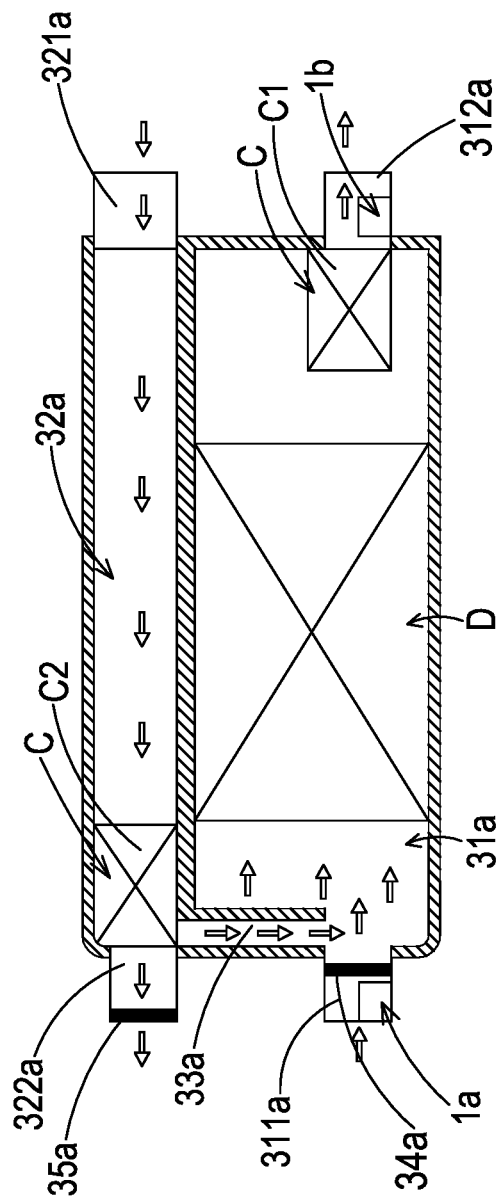
FIG. 11 illustrates a cross-sectional view (2) of a gas-exchange processing device of the exemplary embodiment in the present disclosure.

In one embodiment of the present invention, as shown in FIG. 11, the gas-exchange processing device 3 includes an intake channel 31a, a discharge channel 32a, and a circulation channel 33a. The intake channel 31a has at least one intake entrance 311a and at least one intake exit 312a. The discharge channel 32a has at least one discharge entrance 321a and at least one discharge exit 322a. At least one of the indoor gas detection modules 1a is disposed at the intake entrance 311a of the intake channel 31a, and at least one of the indoor gas detection modules 1b is disposed at the intake exit 312a of the intake channel 31a.

In one embodiment of the present invention, the gas-exchange processing device 3 further includes a flow-guiding component C and a cleaning and filtration assembly D.

The flow-guiding component C of the gas-exchange processing device 3 includes an intake flow-guiding component C1 and a discharge flow-guiding component C2. The cleaning and filtration assembly D of the gas-exchange processing device 3 and the intake flow-guiding component C1 are disposed in the intake channel 31a, and the intake flow-guiding component C1 guides the outdoor gas in the outdoor space B into the cleaning and filtration assembly D of the gas-exchange processing device 3 through the intake channel 31a for introducing and filtering the outdoor gas into the indoor space A. The discharge flow-guiding component C2 is disposed in the discharge channel 32a to extract the air pollution source in the indoor space A and discharge the air pollution source to the outdoor space B through the discharge channel 32a. The circulation channel 33a is in communication between the intake channel 31a and the discharge channel 32a. The discharge flow-guiding component C2 extracts the air pollution source of the indoor space A into the discharge channel 32a, the air pollution source is introduced into the intake channel 31a through the circulation channel 33a, and then the intake flow-guiding component C1 guides the air pollution source to pass through the cleaning and filtration assembly D of the gas-exchange processing device 3, the air pollution source then being introduced into the indoor space A again for achieving a circulating filtration.

Moreover, in some embodiments, an intake valve 34a is disposed at the intake entrance 311a of the intake channel 31a, and a discharge valve 35a is disposed at the discharge exit 322a of the discharge channel 32a. The intelligent control-driving processing device 2 may receive the indoor gas detection data and the outdoor gas detection data through a wireless transmission. When the intelligent control-driving processing device 2 receives and compares the indoor gas detection data and the outdoor gas detection data to perform the intelligent selection, identifying that the indoor gas detection data is higher than the outdoor gas detection data, the intelligent control-driving processing device 2 selectively transmits the driving command to the outdoor gas detection module 1a for enabling the operation of the gas-exchange processing device 3 and controlling the intake valve 34a and the discharge valve 35a to be opened. Accordingly, the intake flow-guiding component C1 guides the outdoor gas in the outdoor space B to pass through the cleaning and filtration assembly D of the gas-exchange processing device 3 to filter and purify the outdoor gas, and introduce the outdoor gas into the indoor space A to form the clean air under the surveillance condition. Alternatively, when the intelligent control-driving processing device 2 receives and compares the indoor gas detection data and the outdoor gas detection data to perform the intelligent selection, identifying that the indoor gas detection data is lower than the outdoor gas detection data, the intelligent control-driving processing device 2 selectively transmits the driving command to the outdoor gas detection module 1a for enabling the operation of the gas-exchange processing device 3 and controlling the intake valve 34a to be closed and the discharge valve 35a to be opened. Accordingly, the discharge flow-guiding component C2 guides the air pollution source in the indoor space A to be extracted and discharged to the outdoor space B or to be extracted and introduced into the intake channel 31a through the circulation channel 33a, so that the air pollution source is introduced into the cleaning and filtration assembly D of the gas-exchange processing device 3 again by the intake flow-guiding component C1 to be filtered and purified and then introduced in to the indoor space A to form the clean air.

The wireless transmission may be achieved by an infrared module, wireless radiofrequency module, a Wi-Fi module, a Bluetooth module, or a near field communication (NFC) module.

The indoor cleaning and filtration device 4 includes a flow-guiding component C, a cleaning and filtration assembly D, and a monitor, wherein the monitor is adapted to display the indoor gas detection data. The indoor cleaning and filtration device 4 receives the driving command transmitted by the intelligent control-driving processing device 2 to filter the air pollution source in the indoor space A. Please refer to FIG. 12. At least one indoor gas detection module 1b is disposed in an intake path of the indoor cleaning and filtration device 4, and at least one indoor gas detection module 1b is disposed in a discharge path of the indoor cleaning and filtration device 4. The intelligent control-driving processing device 2 receives and compares the indoor gas detection data detected by the indoor gas detection module from the indoor space A for controlling the indoor cleaning and filtration device 4 to be enabled in real-time under a surveillance condition, therefore the air pollution source in the indoor space A passes through the indoor cleaning and filtration device 4, allowing the air pollution source in the indoor space A to be filtered and exchanged to become a clean air.

It is understood that in one preferred embodiment of the present invention, the definition of the surveillance condition is defined as the gas detection data of the air pollution source in the indoor space A detected by the gas detection modules 1 exceeds a safety detection value. The safety detection value includes at least one selected from the group consisting of, but not limit to the following parameter: a concentration of PM2.5 which is less than 35 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit of bacteria which is less than 1500 $CFU/m^3$, a colony-forming unit of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 $\mu g/m^3$.

Moreover, in some embodiments, the intelligent control-driving processing device 2 receives and compares the indoor gas detection data detected by at least three of the indoor gas detection modules 1b to perform intelligent computation for finding out a location of the indoor space A containing the air pollution source. Accordingly, the intelligent control-driving processing device 2 intelligently and selectively enables the operation of a gas-exchange processing device 3 or an indoor cleaning and filtration device 4 nearby the air pollution source. Therefore, the air pollution source can be purified to become a clean air and the spreading of the air pollution source can be prevented.

Alternatively, in some other embodiments, the intelligent control-driving processing device 2 receives and compares the indoor gas detection data detected by at least three of the indoor gas detection modules 1b to perform intelligent computation for finding out a location of the indoor space A containing the air pollution source. Accordingly, the intelligent control-driving processing device 2 intelligently and selectively enables the operation of a gas-exchange processing device 3 or an indoor cleaning and filtration device 4 nearby the air pollution source with first priority, and the intelligent control-driving processing device 2 performs intelligent computation to enable rest of the indoor cleaning and filtration devices 4, forming a flow for guiding the air pollution source in the indoor space A, thereby making the indoor cleaning and filtration device 4 nearby the air pollution source for being quickly filtered.

In one embodiment of the present invention, the indoor cleaning and filtration device 4 is an air conditioner 4a, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, and allowing the air pollution source in the indoor space A to be filtered to form the clean air.

In one embodiment of the present invention, the indoor cleaning and filtration device 4 is a cooker hood 4b, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, and allowing the air pollution source in the indoor space A to be filtered to form the clean air.

In one embodiment of the present invention, the indoor cleaning and filtration device 4 is a ventilator 4c, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, and allowing the air pollution source in the indoor space A to be filtered to form the clean air.

In one embodiment of the present invention, the indoor cleaning and filtration device 4 is a cleaner 4d, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, and allowing the air pollution source in the indoor space A to be filtered to form the clean air.

In one embodiment of the present invention, the indoor cleaning and filtration device 4 is an electric fan 4e, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, thus allowing the air pollution source in the indoor space A to be filtered to form the clean air.

In one embodiment of the present invention, the indoor cleaning and filtration device 4 is a vacuum cleaner, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, thus allowing the air pollution source in the indoor space A to be filtered to form the clean air.

In one embodiment of the present invention, the indoor cleaning and filtration device 4 is a blower fan, the indoor gas detection module 1b is assembled on the indoor cleaning and filtration device 4 for enabling the operation of the indoor cleaning and filtration device 4, wherein the cleaning and filtration assembly D of the indoor cleaning and filtration device 4 is disposed in front of the flow-guiding component C of the indoor cleaning and filtration device 4. Moreover, the intelligent control-driving processing device 2 receives and compares the outdoor gas detection data and the indoor gas detection data, performing an intelligent selection and transmitting the driving command to the indoor gas detection module 1b for enabling the operation of the indoor cleaning and filtration device 4, making the flow-guiding component C of the indoor cleaning and filtration device 4 guide the air pollution source in the indoor space A to pass through the cleaning and filtration assembly D of the indoor cleaning and filtration device 4 for filtration, and allowing the air pollution source in the indoor space A to be filtered to form the clean air.

Figure 12:
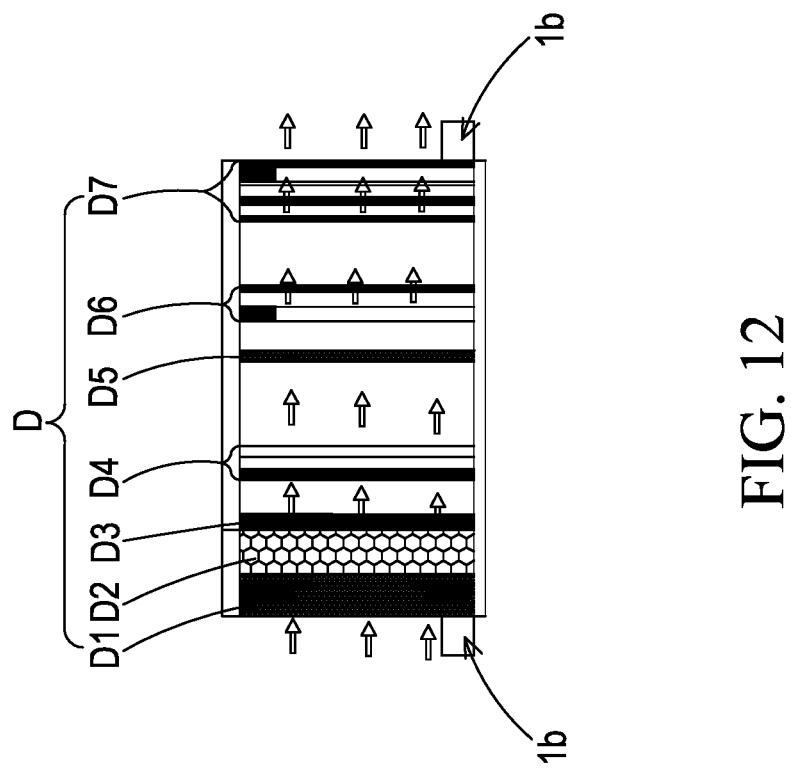
FIG. 12 illustrates a cross-sectional view (3) of a cleaning and filtration assembly of the exemplary embodiment in the present disclosure.

Please refer to FIG. 12. The cleaning and filtration assembly D of the gas-exchange processing device 3 and/or the indoor cleaning and filtration device 4 may be the combination of various embodiments. In one embodiment, the cleaning and filtration assembly D may be a combination of an activated carbon D1 and a high-efficiency particulate air (HEPA) filter D2, or a combination of the activated carbon D1, the high-efficiency particulate air filter D2, and a zeolite mesh D3. The activated carbon D1 is provided for filtering and absorbing PM2.5, the zeolite mesh D3 is provided for filtering and absorbing volatile organic compound (VOC), and the high-efficiency particulate air filter D2 is provided for absorbing the chemical smog, bacteria, dusts, particles, and pollens contained in the polluted gas, thereby the polluted gas introduced into the cleaning and filtration assembly D is filtered and purified. In some embodiments, a cleansing factor layer having chlorine dioxide is coated on the high-efficiency particulate air filter D2 for suppressing viruses, bacteria, fungus, influenza A virus, influenza B virus, Enterovirus, and Norovirus in the polluted gas introduced into the cleaning and filtration assembly D. Accordingly, the suppressing rate may exceed 99%, allowing the reduction of the cross infections of the viruses. In some other embodiments, a herbal protection coating layer including the extracts of Rhus chinensis Mill (may be Rhus chinensis Mill from Japan) and the extracts of Ginkgo biloba may be coated on the high-efficiency particulate air filter D2 to form a herbal protection anti-allergy filter which can efficiently perform anti-allergy function and destroy cell surface proteins of influenza viruses (e.g., influenza virus subtype H1N1) passing through the herbal protection anti-allergy filter. Alternatively, in some other embodiments, a layer of silver ions may be coated on the high-efficiency particulate air filter D2 for suppressing viruses, bacteria, and fungus in the polluted gas introduced by the cleaning and filtration assembly D.

In another embodiment, the cleaning and filtration assembly D may be a combination of the activated carbon D1, the high-efficiency particulate air filter D2, the zeolite mesh D1, and a photocatalyst unit D4. In the present embodiment, since the conversion from light energy into chemical energy is made by the photocatalyst unit D4, once the polluted gas in the indoor space is introduced into the cleaning and filtration assembly D, the hazardous matters in the polluted gas are degraded and sterilized to achieve the effect of filtration and purification by the cleaning and filtration assembly D.

In another embodiment, the cleaning and filtration assembly D may be a combination of the activated carbon D1, the high-efficiency particulate air filter D2, the zeolite mesh D3, and a photo plasma unit D5. The photo plasma unit D5 includes a nanometer light tube. The polluted gas introduced from the cleaning and filtration assembly D through the illumination of light irradiated from the nanometer light tube, the volatile organic gases contained in the polluted gas can be degraded and purified. When the polluted gas is introduced into the cleaning and filtration assembly D, the introduced polluted gas is illuminated by the light irradiated from the nanometer light tube, making the oxygen molecules and water molecules in the polluted gas degrade into high oxidative photo plasma for forming a plasma flow which is capable of destroying the organic molecules. Accordingly, volatile organic compounds (VOC) such as formaldehyde and toluene in the polluted gas can be degraded into water and carbon dioxide. Thus, the polluted gas can be filtered and purified by the cleaning and filtration assembly D.

In another embodiment, the cleaning and filtration assembly D may be a combination of the activated carbon D1, the high-efficiency particulate air filter D2, the zeolite mesh D3, and a negative ion unit D6. Through applying high voltage discharging to the polluted gas introduced into the cleaning and filtration assembly D, the particulates carry with positive charges in the polluted gas are adhered to the dust-collecting plate carry with negative charges. Accordingly, the polluted gas is filtered and purified by the cleaning and filtration assembly D.

In another embodiment, the cleaning and filtration assembly D may be a combination of the activated carbon D1, the high-efficiency particulate air filter D2, the zeolite mesh D3, and a plasma ion unit D7. The plasma ion unit D7 generates a high-voltage plasma. Therefore, the viruses and the bacteria in the polluted gas introduced into the cleaning and filtration assembly D are degraded by the high-voltage plasma. Moreover, through the high-voltage plasma, when the polluted gas is introduced into the cleaning and filtration assembly D, the oxygen molecules and the water molecules in the polluted gas are ionized to form cations ($H^+$) and anions ($O_2^-$). The substances attached with water molecules around the ions are attached on the surfaces of viruses and bacteria, converting the water molecules into oxidative oxygen ions (hydroxyl ions, $OH^-$ ions), and the oxidative oxygen ions take away the hydrogen ions of the proteins on the surfaces of the viruses and the bacteria to degrade the microorganisms as mentioned above. Accordingly, the polluted gas is filtered and purified by the cleaning and filtration assembly D.

In one embodiment, the cleaning and filtration assembly D may only include the high-efficiency particulate air filter D2. Alternatively, in another embodiment, the cleaning and filtration assembly D may be a combination of the high-efficiency particulate air filter D2 and any one of the photocatalyst unit D4, the photo plasma unit D5, the negative ion unit D6, and the plasma ion unit D7. In one embodiment, the cleaning and filtration assembly D may be a combination of the high-efficiency particulate air filter D2 and any two of the photocatalyst unit D4, the photo plasma unit D5, the negative ion unit D6, and the plasma ion unit D7. In one embodiment, the cleaning and filtration assembly D may be a combination of the high-efficiency particulate air filter D2 and any three of the photocatalyst unit D4, the photo plasma unit D5, the negative ion unit D6, and the plasma ion unit D7. In one embodiment, the cleaning and filtration assembly D may be a combination of the high-efficiency particulate air filter D2 and all of the photocatalyst unit D4, the photo plasma unit D5, the negative ion unit D6, and the plasma ion unit D7.

The polluted gas may include at least one selected from the group consisting of particulate matters, carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, and viruses.

After describing the operation of the indoor air pollution prevention system according to one or some embodiments, the operation of the gas transmission of the gas detection module 1 is described as below.

As shown in FIG. 3 to FIG. 9A, the gas detection module 1 includes a control circuit board 11, a gas detection main body 12, a microprocessor 13, and a communication device 14. Wherein the gas detection main body 12, the microprocessor 13, and the communication device 14 are integrally packaged with the control circuit board 11 and electrically connected to each other. The microprocessor 13 and the communication device 14 are disposed on the control circuit board 11. The microprocessor 13 controls the driving signal of the gas detection main body 12 to enable the gas detection main body 12, which receive the information of the polluted gas detected by the gas detection device 1a for computation, communicates outwardly through the communication device 14, and converts the information into a gas detection data for storage. The communication device 14 receives the gas detection data outputted from the microprocessor 13 and transmits the gas detection data to a cloud processing device 2b or to an external device (which may be a mobile device 22a). Moreover, in some embodiments, the outwardly communication transmission of the communication devices 14 may be implemented through a bidirectional wired transmission. For example, the wired transmission may be achieved by a USB port, a mini-USB port, and micro-USB port. The outwardly communication transmission of the communication devices 14 may also be implemented through a bidirectional wireless transmission. For example, the wireless transmission may be achieved by a Wi-Fi module, a Bluetooth module, a radiofrequency identification module, and a near field communication module.

Moreover, in one or some embodiments, the gas detection main body 12 includes a base 121, a piezoelectric actuator 122, a driving circuit board 123, a laser component 124, a particulate sensor 125, an outer cap 126, and a gas sensor 127. The base 121 has a first surface 1211, a second surface 1212, a laser configuration region 1213, a gas inlet groove 1214, a gas-guiding component loading region 1215, and a gas outlet groove 1216. Wherein the first surface 1211 and the second surface 1212 are opposite to each other. The laser configuration region 1213 is hollowed out from the first surface 1211 to the second surface 1212 for accommodating the laser component 124. The outer cap 126 covers the base 121 and has a side plate 1261. The side plate 1261 has a gas inlet opening 1261a and a gas outlet opening 1261b. The gas inlet groove 1214 is recessed from the second surface 1212 and located adjacent to the laser configuration region 1213. The gas inlet groove 1214 has a gas inlet through hole 1214a and two lateral walls. The gas inlet through hole 1214a penetrates inside and outside of the base 121 and corresponds to the gas inlet opening 1261a of the outer cap 126. Two light permissive windows 1214b penetrate the two lateral walls of the gas inlet groove 1214 and are in communication with the laser configuration region 1213. Therefore, the first surface 1211 of the base 121 is covered by the outer cap 126, and the second surface 1212 of the base 121 is covered by the driving circuit board 123, therefore, a gas inlet path with the gas inlet groove 1214 can be defined as resulting from the aforementioned structure.

The gas-guiding component loading region 1215 is recessed from the second surface 1212 and in communication with the gas inlet groove 1214. A gas flowing hole 1215a penetrates a bottom surface of the gas-guiding component loading region 1215. Each of four corners of the gas-guiding component loading region 1215 has a positioning bump 1215b. The gas outlet groove 1216 has a gas outlet through hole 1216a, and the gas outlet through hole 1216a is corresponding to the gas outlet opening 1261b of the outer cap 126. The gas outlet groove 1216 includes a first region 1216b and a second region 1216c. The first region 1216b is recessed from a portion of the first surface 1211 corresponding to a vertical projection region of the gas-guiding component loading region 1215. The second region 1216c is at a portion extending from a portion not corresponding to the vertical projection region of the gas-guiding component loading region 1215, and the second region 1216c is hollowed out from the first surface 1211 to the second surface 1212 in a region where the first surface 1211 is not aligned with the gas-guiding component loading region 1215. The first region 1216b is connected to the second region 1216c to form a stepped structure. Moreover, the first region 1216b of the gas outlet groove 1216 is in communication with the gas flowing hole 1215a of the gas-guiding component loading region 1215, and the second region 1216c of the gas outlet groove 1216 is in communication with the gas outlet through hole 1216a. Therefore, when the first surface 1211 of the base 121 is covered by the outer cap 126 and the second surface 1212 of the base 121 is covered by the driving circuit board 123, the gas outlet groove 1216 and the driving circuit board 123 together define a gas outlet path.

Furthermore, the laser component 124 and the particulate sensor 125 are disposed on the driving circuit board 123 and located in the base 121, wherein the laser component 124 and the particulate sensor 125 are electrically connected to the driving circuit board 123. One should notice that to clearly explain the positions of the laser component 124, the particulate sensor 125, and the base 121, the driving circuit board 123 is not illustrated. In the embodiment of the present disclosure, the laser component 124 is located at the laser configuration region 1213 of the base 121. The particulate sensor 125 is located at the gas inlet groove 1214 of the base 121 and aligned with the laser component 124. Moreover, the laser component 124 corresponds to the light permissive windows 1214b, allowing the light beam emitted by the laser component 124 to pass therethrough into the gas inlet groove 1214. The path of the light beam emitted by the laser component 124 passes through the light permissive windows 1214b and is orthogonal to the gas inlet groove 1214. The light beam emitted by the laser component 124 pass through into the gas inlet groove 1214 by the light permissive windows 1214b, and the particulate matters in the gas inlet groove 1214 is illuminated by the light beam. When the light beam encounters the particulate matters, the light beam will be scattered to generate light spots. Hence, the particulate sensor 125 receives and calculates the light spots generated by the scattering to obtain the detection data of the gas (particulates information). Furthermore, the gas sensor 127 is disposed on the driving circuit board 123, and is located at the gas outlet groove 1216 for detecting the polluted gas introduced into the gas outlet groove 1216, wherein the gas sensor 127 is electrically connected to the driving circuit board 123. In one embodiment of the present disclosure, the gas sensor 127 includes at least one selected from the group consisting of a volatile organic compound detector capable of detecting gas information of carbon dioxide ($CO_2$) or total volatile organic compounds (TVOC), a formaldehyde sensor capable of detecting gas information of formaldehyde (HCHO) gas, a bacterial sensor capable of detecting information of bacteria or fungi, and a virus sensor capable of detecting information of viruses.

Moreover, the piezoelectric actuator 122 is located at the gas-guiding component loading region 1215 with square-shaped of the base 121, wherein the gas-guiding component loading region 1215 is interconnected with the gas inlet groove 1214. When the piezoelectric actuator 122 operates, the gas in the gas inlet groove 1214 is driven into the piezoelectric actuator 122, thereby the gas would pass through the gas flowing hole 1215a of the gas-guiding component loading region 1215, and entering into the gas outlet groove 1216. Moreover, the driving circuit board 123 covers the second surface 1212 of the base 121. The laser component 124 and particulate sensor 125 are disposed on the driving circuit board 123, also the laser component 124 and particulate sensor 125 are electrically connected to the driving circuit board 123. As the outer cap 126 covers the base 121, the gas inlet opening 1216a is corresponding to the gas inlet through hole 1214a of the base 121, and the gas outlet opening 1216b is corresponding to the gas outlet through hole 1216a of the base 121.

Furthermore, the piezoelectric actuator 122 includes a nozzle plate 1221, a chamber frame 1222, an actuation body 1223, an insulation frame 1224, and a conductive frame 1225. The nozzle plate 1221 is made by a flexible material and has a suspension sheet 1221a and a hollow hole 1221b. The suspension sheet 1221a is a flexible sheet which can bend and vibrate. The shape and the size of the suspension sheet 1221a approximately correspond to those of the inner edge of the gas-guiding component loading region 1215. The hollow hole 1221b penetrates through the center portion of the suspension sheet 1221a for the gas flowing therethrough. In one preferred embodiment of the present invention, the shape of the suspension sheet 1221a can be selected from square, circle, ellipse, triangle, and polygon.

Furthermore, the chamber frame 1222 is stacked on the nozzle plate 1221, and the shape of the chamber frame 1222 is corresponding to the shape of the nozzle plate 1221. The actuation body 1223 is stacked on the chamber frame 1222. A resonance chamber 1226 is defined through the stack structure of the actuation body 1223, the nozzle plate 1221, and the suspension sheet 1221a. The insulation frame 1224 is stacked on the actuation body 1223. The appearance of the insulation frame 1224 is similar to the appearance of the nozzle plate 1221. The conductive frame 1225 is stacked on the insulation frame 1224. The appearance of the conductive frame 1225 is similar to the appearance of the insulation frame 1224. The conductive frame 1225 has a conductive frame pin 1225a and a conductive electrode 1225b. The conductive frame pin 1225a extends outwardly from the outer edge of the conductive frame 1225, and the conductive electrode 1225b extends inwardly from the inner edge of the conductive frame 1225.

Moreover, the actuation body 1223 further includes a piezoelectric carrier plate 1223a, an adjusting resonance plate 1223b, and a piezoelectric plate 1223c. Wherein the piezoelectric carrier plate 1223a is stacked on the chamber frame 1222; the adjusting resonance plate 1223b is stacked on the piezoelectric carrier plate 1223a; the piezoelectric plate 1223c is stacked on the adjusting resonance plate 1223b. The adjusting resonance plate 1223b and the piezoelectric plate 1223c are accommodated in the insulation frame 1224. The conductive electrode 1225b of the conductive frame 1225 is electrically connected to the piezoelectric plate 1223c. In one embodiment, the piezoelectric carrier plate 1223a and the adjusting resonance plate 1223b are both made of the same conductive material or different conductive materials. The piezoelectric carrier plate 1223a has a piezoelectric pin 1223d. The piezoelectric pin 1223d and the conductive frame pin 1225a are electrical connection with a driving circuit (not shown) of the driving circuit board 123 to receive a driving signal (which may be a driving frequency and a driving voltage). The piezoelectric pin 1223d, the piezoelectric carrier plate 1223a, the adjusting resonance plate 1223b, the piezoelectric plate 1223c, the conductive electrode 1225b, the conductive frame 1225, and the conductive frame pin 1225a may together form an electrical circuit for transmitting the driving signal, and the insulation frame 1224 is provided for electrically isolating the conductive frame 1225 from the actuation body 1223 for avoiding short circuit, thereby the driving signal can be transmitted to the piezoelectric plate 1223c. When the piezoelectric plate 1223c receives the driving signal, the piezoelectric plate 1223c deforms owing to the piezoelectric effect, and thus the piezoelectric carrier plate 1223a and the adjusting resonance plate 1223b are driven to perform reciprocating vibration correspondingly.

Moreover, the adjusting resonance plate 1223b is disposed between the piezoelectric plate 1223c and the piezoelectric carrier plate 1223a as a cushion element so as to adjust the vibration frequency of the piezoelectric carrier plate 1223a. Generally, the thickness of the adjusting resonance plate 1223b is greater than the thickness of the piezoelectric carrier plate 1223a. The thickness of the adjusting resonance plate 1223b may be changed to adjust the vibration frequency of the actuation body 1223. The nozzle plate 1221, the chamber frame 1222, the actuation body 1223, the insulation frame 1224, and the conductive frame 1225 are sequentially stacked and assembled, making the piezoelectric actuator 122 be placed and positioned in the gas-guiding component loading region 1215, thus, a clearance 1221c is defined between the suspension sheet 1221a and the inner edge of the gas-guiding component loading region 1215 for the gas to pass therethrough.

Figure 10A:
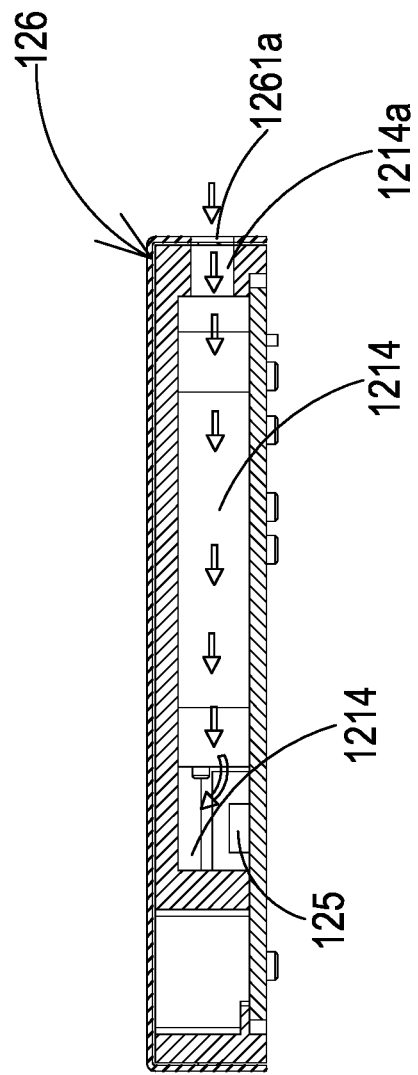
FIG. 10A illustrates a schematic cross-sectional view showing that the gas enters into the gas detection main body through the gas inlet through hole of the outer cap.
Figure 10B:
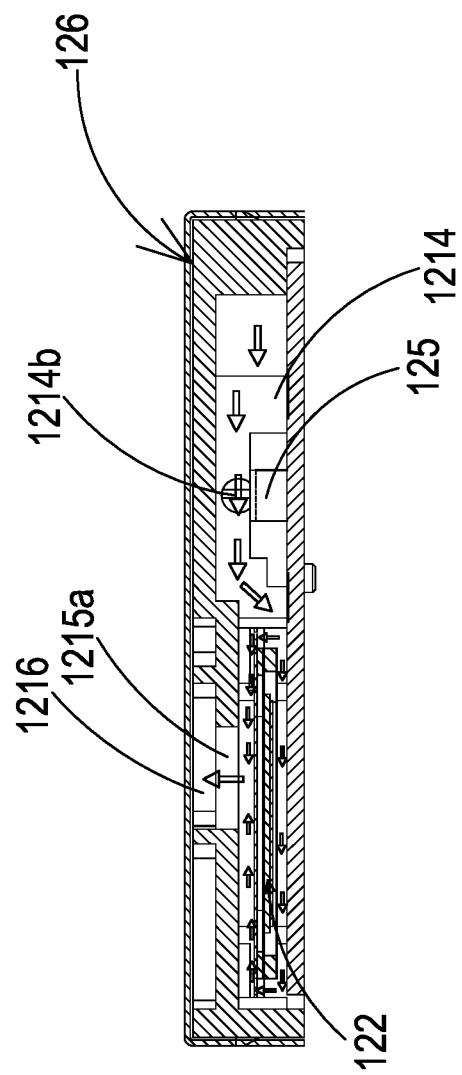
FIG. 10B illustrates a schematic cross-sectional view showing that the laser component emits the light beam to enter into the gas inlet groove through the light permissive windows.
Figure 10C:
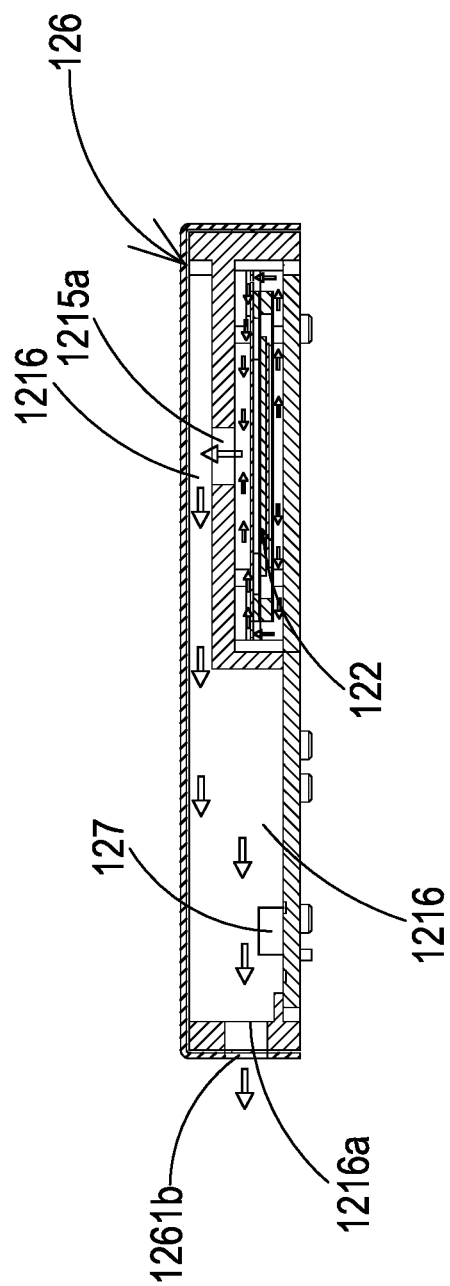
FIG. 10C illustrates a schematic cross-sectional view showing that the gas in the gas outlet groove is pushed to pass through the gas outlet through hole and the gas outlet opening to be discharged outwardly.

Please refer to the FIG. 10A, FIG. 10B, and FIG. 10C, a gas flow chamber 1227 is formed between a bottom of the nozzle plate 1221 and the bottom surface of the gas-guiding component loading region 1215. The gas flow chamber 1227 connect with the resonance chamber 1226 formed between the actuation body 1223, the nozzle plate 1221, and the suspension sheet 1221a through the hollow hole 1221b of the nozzle plate 1221. In one aspect of the present invention, the resonance chamber 1226 and the suspension sheet 1221a can generate the Helmholtz resonance effect to improve the transmission efficiency of the gas through the vibration frequencies of the gas in the resonance chamber 1226 and suspension sheet 1221a are approaching the same. When the piezoelectric plate 1223c moves in a direction away from the bottom surface of the gas-guiding component loading region 1215, the piezoelectric plate 1223c drives the suspension sheet 1221a of the nozzle plate 1221 to move in the direction away from the bottom surface of the gas-guiding component loading region 1215 correspondingly. Hence, the volume of the gas flow chamber 1227 expands dramatically, therefore the internal pressure of the gas flow chamber 1227 decreases and creates a negative pressure, drawing the gas outside the piezoelectric actuator 122 to flow into the piezoelectric actuator 122 through the clearance 1221c and enter into the resonance chamber 1226 through the hollow hole 1221b, thereby increasing the gas pressure of the resonance chamber 1226 and thus generating a pressure gradient. When the piezoelectric plate 1223c drives the suspension sheet 1221a of the nozzle plate 1221 to move toward the bottom surface of the gas-guiding component loading region 1215, the gas inside the resonance chamber 1226 is pushed to flow out quickly through the hollow hole 1221b to further push the gas inside the gas flow chamber 1227, thereby the converged gas can be quickly and massively ejected out of the gas flow chamber 1227 and introduced into the gas flowing hole 1215a of the gas-guiding loading region 1215 in a state closing to an ideal gas state under the Benulli's law.

Figure 9A:
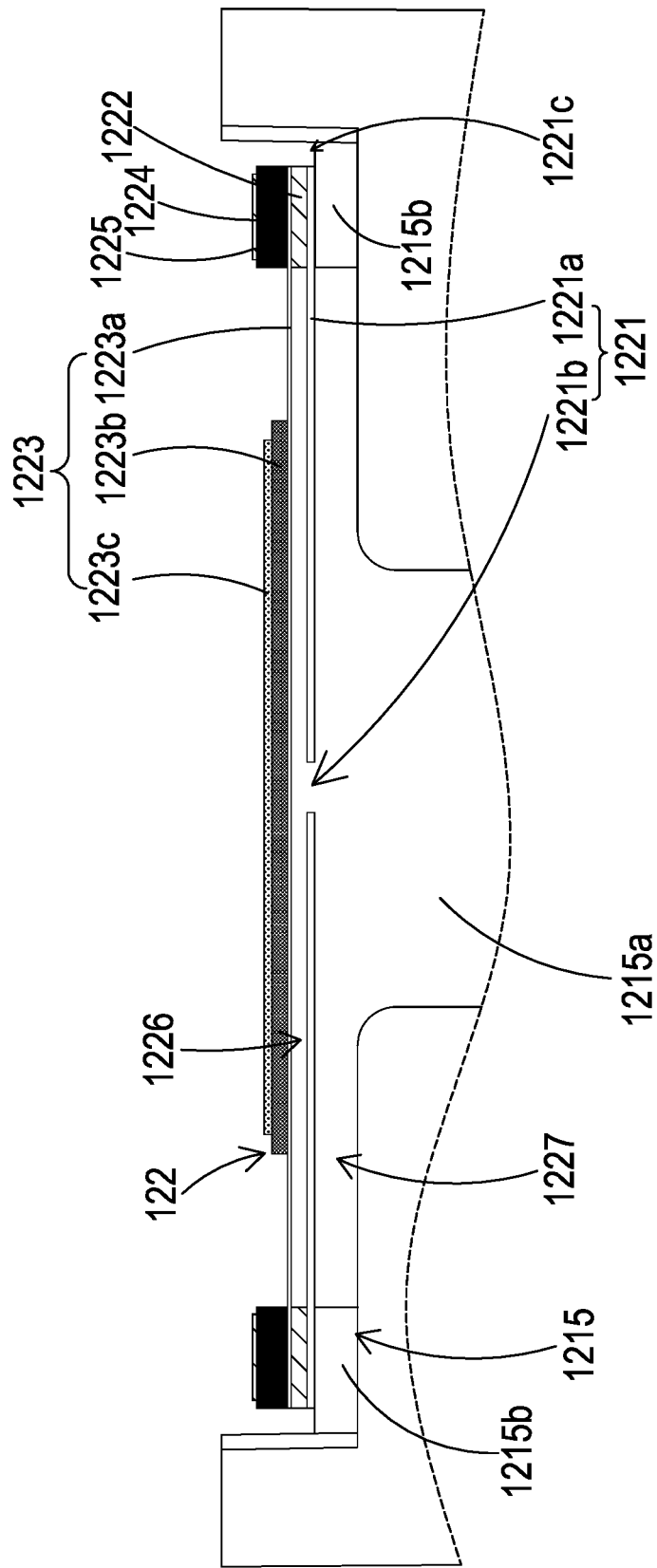
FIG. 9A illustrates a cross-sectional view of the piezoelectric actuator before the operation of the exemplary embodiment in the present disclosure.
Figure 9B:
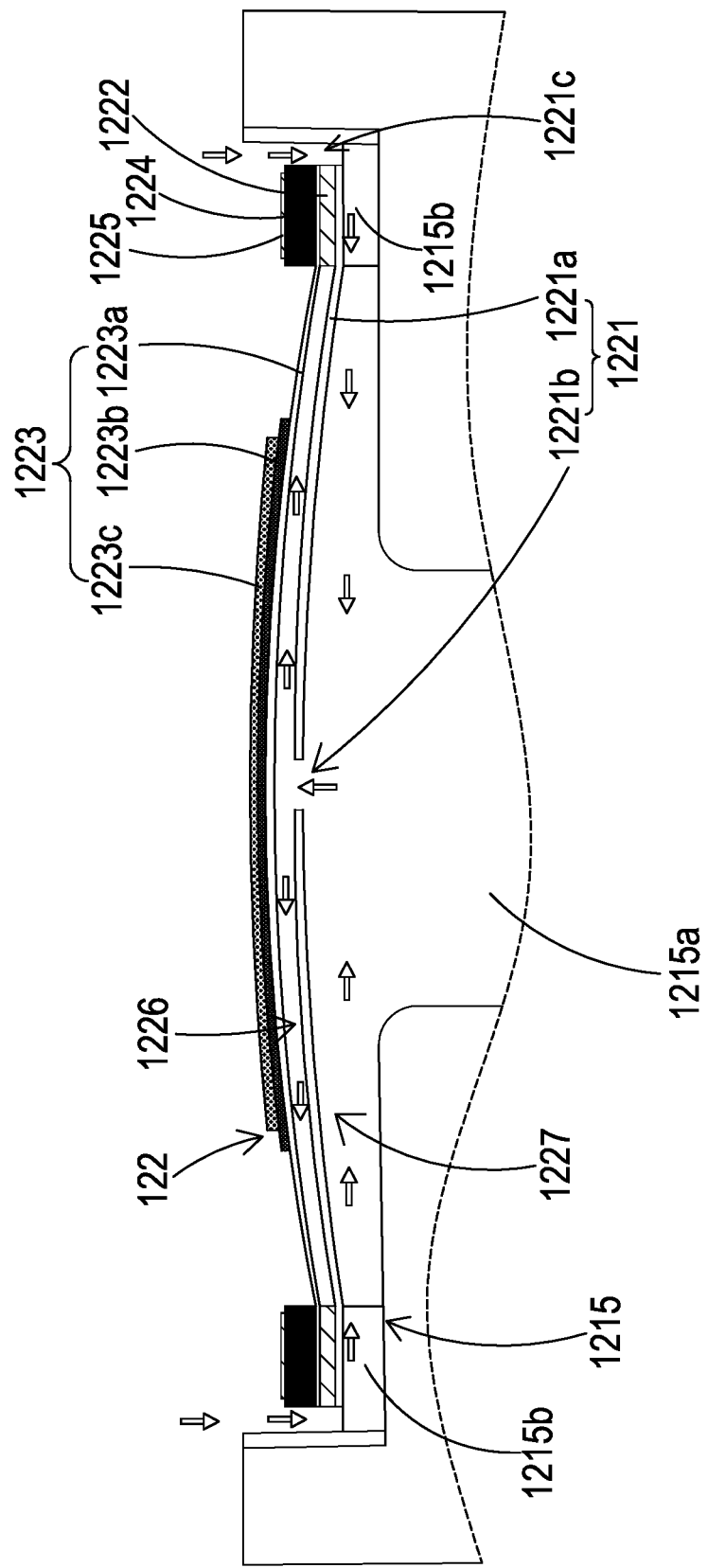
FIG. 9B illustrates a cross-sectional view showing the operation (1) of the piezoelectric actuator of the exemplary embodiment in the present disclosure.
Figure 9C:
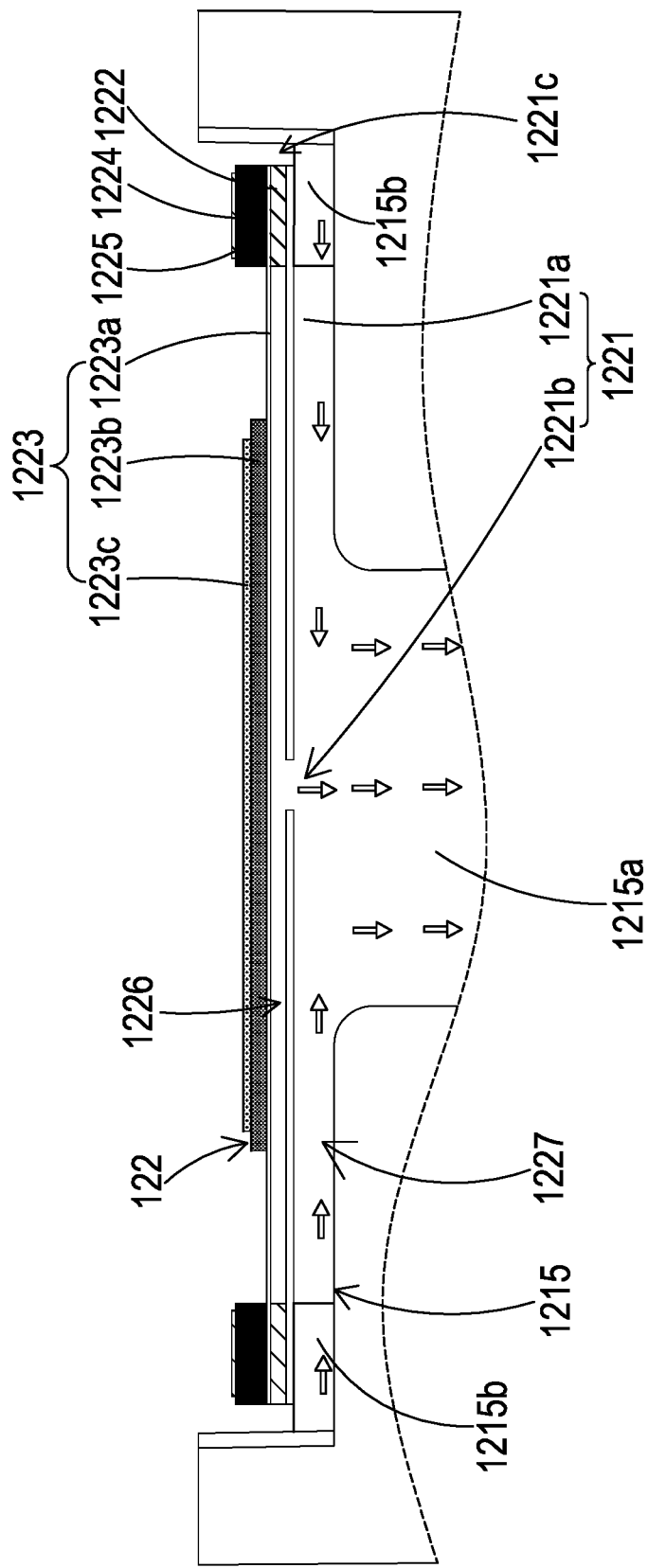
FIG. 9C illustrates a cross-sectional view showing the operation (2) of the piezoelectric actuator of the exemplary embodiment in the present disclosure.

Therefore, through repeating the steps as shown in FIG. 9B and FIG. 9C, the piezoelectric plate 1223c can bend and vibrate reciprocatingly. Further, after the gas is discharged out of the resonance chamber 1226, the internal pressure of the resonance chamber 1226 is lower than the equilibrium pressure due to the inertia, as a result, the pressure difference guides the gas outside the resonance chamber 1226 into the resonance chamber 1226 again. Thus, the resonance chamber 1226 and the piezoelectric plate 1223c can generate the Helmholtz resonance effect to achieve effective, high-speed and large-volume gas transmission of the gas when the vibration frequencies of the gas in the resonance chamber 1226 and piezoelectric plate 1223c are approaching the same.

Moreover, as shown in FIG. 10A to FIG. 10C, the gas enters into the gas inlet opening 1214a from the outer cap 126, which flow into the gas inlet groove 1214 of the base 121 through the gas inlet opening 1214a for reaching the position of the particulate sensor 125. Furthermore, the piezoelectric actuator 122 continuously drives the gas into the gas inlet path to facilitate the gas inside the detection main body 12 stably and quickly pass through the particulate sensor 125. Next, the light beam emitted by the laser component 124 passes through the light permissive windows 1214b and enters into the gas inlet groove 1214. The gas in the gas inlet groove 1214 which passes through the particulate sensor 125 is illuminated by the light beam. When the light beam encounters the particulate matters in the gas, the light beam will be scattered to generate light spots. The particulate sensor 125 receives and calculates the light spots generated by the scattering, to obtain the information such as the particle size and the concentration of the particulate matters in the gas. Moreover, the gas passing through the particulate sensor 125 is continuously introduced into the gas flowing hole 1215a of the gas-guiding component loading region 1215 by the driving of the piezoelectric actuator 122 and enters into the gas outlet groove 1216. Finally, after the gas enters into the gas outlet groove 1216, since the piezoelectric actuator 122 continuously delivers the gas into gas outlet groove 1216, therefore the gas is pushed continuously, which discharged out of the gas detection main body 12 eventually through the gas outlet through hole 1216a and the gas outlet opening 1261b.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An indoor air pollution prevention system, adapted to perform gas exchange and filtration for an air pollution source in an indoor space, wherein the indoor air pollution prevention system comprises:
a plurality of gas detection modules comprising at least one outdoor gas detection module and at least one indoor gas detection module, wherein the at least one outdoor gas detection module is disposed in an outdoor space for detecting an outdoor gas in the outdoor space and outputting an outdoor gas detection data, wherein the at least one indoor gas detection module is disposed in the indoor space for detecting the air pollution source in the indoor space and outputting an indoor gas detection data;
at least one control-driving processing device adapted to receive and compare the outdoor gas detection data and the indoor gas detection data outputted by the gas detection modules, transmitting a driving command outwardly;
at least one gas-exchange processing device, wherein the at least one gas-exchange processing device is a fresh air purifier, wherein the at least one outdoor gas detection module and the at least one indoor gas detection module are assembled on the at least one gas-exchange processing device, wherein the at least one gas-exchange processing device comprises an intake channel, a discharge channel, and a circulation channel, wherein the intake channel has at least one intake entrance and at least one intake exit, and the discharge channel has at least one discharge entrance and at least one discharge exit, wherein the at least one outdoor gas detection module is disposed at the at least one intake entrance of the intake channel, and the at least one indoor gas detection module is disposed at the at least one intake exit of the intake channel, wherein the at least one gas-exchange processing device is configured to receive the driving command transmitted by the at least one control-driving processing device to control whether an outdoor gas to be introduced into the indoor space or not, filtering and performing gas exchange of the air pollution source in the indoor space; and
at least one indoor cleaning and filtration device, receiving the driving command transmitted by the at least one control-driving processing device to filter and perform gas exchange of the air pollution source in the indoor space;
wherein each of the at least one gas-exchange processing device comprises a first flow-guiding component and a first cleaning and filtration assembly, and the at least one indoor cleaning and filtration device comprises a second flow-guiding component and a second cleaning and filtration assembly;
wherein the at least one indoor gas detection module enables the operation of the at least one gas-exchange processing device, after the at least one control-driving processing device receives and compares the outdoor gas detection data and the indoor gas detection data, the at least one control-driving processing device performs an selection to transmit the driving command to the at least one indoor gas detection module for enabling the operation of the at least one gas-exchange processing device, therefore the first flow-guiding component guides the outdoor gas in the outdoor space to pass through the first cleaning and filtration assembly to filter and purify the outdoor gas and introduce the outdoor gas into the indoor space, and the air pollution source in the indoor space is extracted by the first flow-guiding component of the at least one gas-exchange processing device, so that the at least one control-driving processing device controls the at least one gas-exchange processing device to introduce the outdoor gas or not, and the at least one control-driving processing device controls the at least one indoor cleaning and filtration device to be enabled in real-time under a surveillance condition, therefore the air pollution source in the indoor space passes through the at least one indoor cleaning and filtration device, allowing the air pollution source in the indoor space to be filtered and exchanged to become filtered air, wherein when the at least one control-driving processing device identifies that the indoor gas detection data is higher than the outdoor gas detection data, the at least one control-driving processing device transmits the driving command to the at least one outdoor gas detection module for enabling the operation of the at least one gas-exchange processing device, therefore the first flow-guiding component guides the outdoor gas in the outdoor space to pass through the first cleaning and filtration assembly of the at least one gas-exchange processing device to filter and purify the outdoor gas and introduce the outdoor gas into the indoor space to form the filtered air under the surveillance condition, wherein when the at least one control-driving processing device identifies that the indoor gas detection data is lower than the outdoor gas detection data, the at least one control-driving processing device transmits the driving command to the at least one outdoor gas detection module for enabling the operation the at least one gas-exchange processing device, making the first flow-guiding component guide the air pollution source in the indoor space to be extracted and discharged to the outdoor space or to be extracted and introduced into the intake channel through the circulation channel, therefore the air pollution source is introduced into the first cleaning and filtration assembly of the at least one gas-exchange processing device again by the first flow-guiding component to be filtered and purified and then introduced in to the indoor space to form the filtered air.

2. The indoor air pollution prevention system according to claim 1, wherein the air pollution source comprises at least one selected from the group consisting of particulate matters, carbon monoxide, carbon dioxide, ozone, sulfur dioxide, nitrogen dioxide, lead, total volatile organic compounds, formaldehyde, bacteria, fungi, and viruses.

3. The indoor air pollution prevention system according to claim 1, wherein under the surveillance condition, the gas detection data of the air pollution source in the indoor space detected by the gas detection modules exceeds a safety detection value.

4. The indoor air pollution prevention system according to claim 3, wherein the safety detection value includes at least one selected from the group consisting of a concentration of PM2.5 which is less than 35 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit of bacteria which is less than 1500 $CFU/m^3$, a colony-forming unit of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 $\mu g/m^3$.

5. The indoor air pollution prevention system according to claim 1, wherein each of the gas detection modules comprises a control circuit board, a gas detection main body, a microprocessor, and a communication device; the gas detection main body, the microprocessor, and the communication device are integrally packaged with the control circuit board and electrically connected to each other; the microprocessor controls the detection of the gas detection main body, the gas detection main body detects the air pollution source to output a detection signal, and the microprocessor receives the detection signal to perform computation to generate and output the gas detection data to the communication device for transmitting outwardly.

6. The indoor air pollution prevention system according to claim 1, wherein the at least one control-driving processing device receives the gas detection data and transmits the driving command through a wireless communication, and the wireless communication is achieved by one of a Wi-Fi module, a Bluetooth module, a radiofrequency identification module, and a near field communication module; the at least one control-driving processing device comprises a receiving driver and a cloud processing device; the receiving driver receives the gas detection data outputted by the gas detection modules and uploads the gas detection data to the cloud processing device, the cloud processing device performs computation and comparison to generate a comparison result, and the cloud processing device transmits the driving command to the receiving driver according to the comparison result, therefore the receiving driver enables the operation of the at least one gas-exchange processing device and the at least one indoor cleaning and filtration device.

7. The indoor air pollution prevention system according to claim 1, wherein the number of the at least one indoor gas detection module is plural; the at least one control-driving processing device receives and compares the indoor gas detection data detected by at least three of the indoor gas detection modules to perform computation for finding out a location of the indoor space containing the air pollution source, and the at least one control-driving processing device enables the operation of a gas-exchange processing device or an indoor cleaning and filtration device nearby the air pollution source.

8. The indoor air pollution prevention system according to claim 1, wherein the number of the at least one indoor gas detection module is plural; the at least one control-driving processing device receives and compares the indoor gas detection data detected by at least three of the indoor gas detection modules to perform computation for finding out a location of the indoor space containing the air pollution source, the at least one control-driving processing device enables the operation of a gas-exchange processing device or an indoor cleaning and filtration device nearby the air pollution source with a first priority, and the at least one control-driving processing device performs computation to enable the operation of rest of the indoor cleaning and filtration devices, forming a flow for guiding the air pollution source in the indoor space, thereby making the indoor cleaning and filtration device nearby the air pollution source for being quickly filtered.

9. The indoor air pollution prevention system according to claim 1, wherein the at least one indoor gas detection module is assembled on a wearable device and is capable of being worn on a human to detect the air pollution source in the indoor space in real-time and transmit the indoor gas detection data to the at least one control-driving processing device.

10. The indoor air pollution prevention system according to claim 1, wherein when the at least one control-driving processing device receives and compares the indoor gas detection data and the outdoor gas detection data to perform the selection, identifying that the indoor gas detection data is higher than the outdoor gas detection data, the at least one control-driving processing device transmits the driving command to the at least one indoor gas detection module for enabling the operation of the at least one gas-exchange processing device, therefore the first flow-guiding component guides the outdoor gas in the outdoor space to pass through the first cleaning and filtration assembly to filter and purify the outdoor gas and introduce the outdoor gas into the indoor space to form the filtered air under the surveillance condition.

11. The indoor air pollution prevention system according to claim 1, wherein the first flow-guiding component of the at least one gas-exchange processing device comprises an intake flow-guiding component and a discharge flow-guiding component; the first cleaning and filtration assembly and the intake flow-guiding component are disposed in the intake channel, and the intake flow-guiding component guides the outdoor gas in the outdoor space to be introduced into the first cleaning and filtration assembly through the intake channel, therefore the outdoor gas is further introduced into the indoor space; the discharge flow-guiding component is disposed in the discharge channel to extract the air pollution source in the indoor space and discharge the air pollution source to the outdoor space through the discharge channel; the circulation channel is in communication between the intake channel and the discharge channel; the discharge flow-guiding component extracts the air pollution source in the indoor space into the discharge channel, the air pollution source is introduced into the intake channel through the circulation channel, and then the intake flow-guiding component guides the air pollution source to pass through the first cleaning and filtration assembly to be introduced into the indoor space again to achieve a circulating filtration for the air pollution source in the indoor space.

12. The indoor air pollution prevention system according to claim 11, wherein an intake valve is disposed at the at least one intake entrance of the intake channel, and a discharge valve is disposed at the at least one discharge exit of the discharge channel; when the at least one control-driving processing device identifies that the indoor gas detection data is higher than the outdoor gas detection data, the at least one control-driving processing device transmits the driving command to the at least one outdoor gas detection module for controlling the intake valve and the discharge valve to be opened.

13. The indoor air pollution prevention system according to claim 11, wherein an intake valve is disposed at the at least one intake entrance of the intake channel, and a discharge valve is disposed at the at least one discharge exit of the discharge channel; when the at least one control-driving processing device identifies that the indoor gas detection data is lower than the outdoor gas detection data, the at least one control-driving processing device transmits the driving command to the at least one outdoor gas detection module for controlling the intake valve to be closed and the discharge valve to be opened.

14. The indoor air pollution prevention system according to claim 1, wherein the number of the at least one indoor gas detection module is plural; at least one of the indoor gas detection modules is disposed in an intake path of the at least one indoor cleaning and filtration device, and at least one of the indoor gas detection modules is disposed in a discharge path of the at least one indoor cleaning and filtration device, the at least one control-driving processing device receives and compares the indoor gas detection data outputted by the indoor gas detection modules, ensuring that the at least one indoor cleaning and filtration device to filter the air pollution source to form the filtered air to be introduced into the indoor space.

15. The indoor air pollution prevention system according to claim 1, wherein the at least one indoor cleaning and filtration device is an air conditioner; the at least one indoor gas detection module is assembled on the at least one indoor cleaning and filtration device for enabling the operation of the at least one indoor cleaning and filtration device; the second cleaning and filtration assembly of the at least one indoor cleaning and filtration device is disposed in front of the second flow-guiding component of the at least one indoor cleaning and filtration device; the at least one control-driving processing device receives and compares the outdoor gas detection data and the indoor gas detection data, performing an selection to transmit the driving command to the at least one indoor gas detection module for enabling the operation of the at least one indoor cleaning and filtration device, making the second flow-guiding component of the at least one indoor cleaning and filtration device guide the air pollution source in the indoor space to pass through the second cleaning and filtration assembly of the at least one indoor cleaning and filtration device for filtration, and allowing the air pollution source in the indoor space to be filtered to form the filtered air.

16. The indoor air pollution prevention system according to claim 1, wherein the at least one indoor cleaning and filtration device is a cooker hood; the at least one indoor gas detection module is assembled on the at least one indoor cleaning and filtration device for enabling the operation of the at least one indoor cleaning and filtration device; the cleaning and filtration assembly of the at least one indoor cleaning and filtration device is disposed behind the flow-guiding component of the at least one indoor cleaning and filtration device; the at least one intelligent control-driving processing device receives and compares the outdoor gas detection data and the indoor gas detection data, performing an intelligent selection to transmit the driving command to the at least one indoor gas detection module for enabling the operation of the at least one indoor cleaning and filtration device, making the second flow-guiding component of the at least one indoor cleaning and filtration device guide the air pollution source in the indoor space to pass through the second cleaning and filtration assembly of the at least one indoor cleaning and filtration device for filtration, and allowing the air pollution source in the indoor space to be filtered to form the clean air.

17. The indoor air pollution prevention system according to claim 1, wherein the at least one indoor cleaning and filtration device is a ventilator; the at least one indoor gas detection module is assembled on the at least one indoor cleaning and filtration device for enabling the operation of the at least one indoor cleaning and filtration device; the cleaning and filtration assembly of the at least one indoor cleaning and filtration device is disposed in front of the flow-guiding component of the at least one indoor cleaning and filtration device; the at least one intelligent control-driving processing device receives and compares the outdoor gas detection data and the indoor gas detection data, performing an intelligent selection to transmit the driving command to the at least one indoor gas detection module for enabling the operation of the at least one indoor cleaning and filtration device, making the second flow-guiding component of the at least one indoor cleaning and filtration device guide the air pollution source in the indoor space to pass through the second cleaning and filtration assembly of the at least one indoor cleaning and filtration device for filtration, and allowing the air pollution source in the indoor space to be filtered to form the clean air.

18. The indoor air pollution prevention system according to claim 1, wherein the at least one indoor cleaning and filtration device is a cleaner; the at least one indoor gas detection module is assembled on the at least one indoor cleaning and filtration device for enabling the operation of the at least one indoor cleaning and filtration device; the cleaning and filtration assembly of the at least one indoor cleaning and filtration device is disposed in front of the flow-guiding component of the at least one indoor cleaning and filtration device; the at least one intelligent control-driving processing device receives and compares the outdoor gas detection data and the indoor gas detection data, performing an intelligent selection to transmit the driving command to the at least one indoor gas detection module for enabling the operation of the at least one indoor cleaning and filtration device, making the second flow-guiding component of the at least one indoor cleaning and filtration device guide the air pollution source in the indoor space to pass through the second cleaning and filtration assembly of the at least one indoor cleaning and filtration device for filtration, and allowing the air pollution source in the indoor space to be filtered to form the clean air.

19. The indoor air pollution prevention system according to claim 1, wherein the at least one indoor cleaning and filtration device is an electric fan; the at least one indoor gas detection module is assembled on the at least one indoor cleaning and filtration device for enabling the operation of the at least one indoor cleaning and filtration device; the cleaning and filtration assembly of the at least one indoor cleaning and filtration device is disposed in front of the flow-guiding component of the at least one indoor cleaning and filtration device; the at least one intelligent control-driving processing device receives and compares the outdoor gas detection data and the indoor gas detection data, performing an intelligent selection to transmit the driving command to the at least one indoor gas detection module for enabling the operation of the at least one indoor cleaning and filtration device, making the second flow-guiding component of the at least one indoor cleaning and filtration device guides the air pollution source in the indoor space to pass through the second cleaning and filtration assembly of the at least one indoor cleaning and filtration device for filtration, thus allowing the air pollution source in the indoor space to be filtered to form the clean air.

20. The indoor air pollution prevention system according to claim 1, wherein the at least one indoor cleaning and filtration device is a vacuum cleaner; the at least one indoor gas detection module is assembled on the at least one indoor cleaning and filtration device for enabling the operation of the at least one indoor cleaning and filtration device; the cleaning and filtration assembly of the at least one indoor cleaning and filtration device is disposed behind the flow-guiding component of the at least one indoor cleaning and filtration device; the at least one intelligent control-driving processing device receives and compares the outdoor gas detection data and the indoor gas detection data, performing an intelligent selection to transmit the driving command to the at least one indoor gas detection module for enabling the operation of the at least one indoor cleaning and filtration device, making the second flow-guiding component of the at least one indoor cleaning and filtration device guide the air pollution source in the indoor space to pass through the second cleaning and filtration assembly of the at least one indoor cleaning and filtration device for filtration, and allowing the air pollution source in the indoor space to be filtered to form the clean air.

21. The indoor air pollution prevention system according to claim 1, wherein the at least one indoor cleaning and filtration device is a blower fan; the at least one indoor gas detection module is assembled on the at least one indoor cleaning and filtration device for enabling the operation of the at least one indoor cleaning and filtration device; the cleaning and filtration assembly of the at least one indoor cleaning and filtration device is disposed in front of the flow-guiding component of the at least one indoor cleaning and filtration device; the at least one intelligent control-driving processing device receives and compares the outdoor gas detection data and the indoor gas detection data, performing an intelligent selection to transmit the driving command to the at least one indoor gas detection module for enabling the operation of the at least one indoor cleaning and filtration device, making the second flow-guiding component guide the air pollution source in the indoor space to pass through the second cleaning and filtration assembly of the at least one indoor cleaning and filtration device for filtration, and allowing the air pollution source in the indoor space to be filtered to form the clean air.

\* \* \* \* \*